US009590872B1

(12) United States Patent
Jagtap et al.

(10) Patent No.: US 9,590,872 B1
(45) Date of Patent: Mar. 7, 2017

(54) AUTOMATED CLOUD IT SERVICES DELIVERY SOLUTION MODEL

(71) Applicant: CA, INC., Islandia, NY (US)

(72) Inventors: Sameer Jagtap, Austin, TX (US); Roger Pilc, Riverside, CT (US); Anand Chauhan, Cary, NC (US); Brian John Hughes, Round Hill, NC (US); Richard William Philyaw, Stony Brook, NY (US); Thirumal Bandi, Hyderabad (IN); Vyacheslav Arkhangelskiy, Brooklyn, NY (US)

(73) Assignee: CA, Inc., New York, NY (US)

( * ) Notice: Subject to any disclaimer, the term of this patent is extended or adjusted under 35 U.S.C. 154(b) by 317 days.

(21) Appl. No.: 13/830,351

(22) Filed: Mar. 14, 2013

(51) Int. Cl.
*H04L 29/08* (2006.01)
*H04L 12/24* (2006.01)

(52) U.S. Cl.
CPC .................... *H04L 41/50* (2013.01)

(58) Field of Classification Search
CPC .......... G06F 2209/5018; G06F 4/5027; G06F 9/44505; G06F 8/60; F06F 8/61
USPC ........................................ 709/217, 223, 226
See application file for complete search history.

(56) References Cited

U.S. PATENT DOCUMENTS

| 8,261,295 | B1 | 9/2012 | Risbood et al. |
| 8,429,540 | B1* | 4/2013 | Yankovich ............ G06F 9/4451 709/204 |
| 2002/0004818 | A1 | 1/2002 | Lansio et al. |
| 2004/0015956 | A1 | 1/2004 | Barfield et al. |
| 2006/0075399 | A1 | 4/2006 | Loh et al. |
| 2006/0224741 | A1 | 10/2006 | Jackson |
| 2007/0038934 | A1 | 2/2007 | Fellman |
| 2008/0184225 | A1* | 7/2008 | Fitzgerald et al. ............... 718/1 |

(Continued)

FOREIGN PATENT DOCUMENTS

| WO | 2009109925 A2 | 9/2009 |
| WO | 2013166682 A1 | 11/2013 |

OTHER PUBLICATIONS

United States Patent and Trademark Office, Office Action for related U.S. Appl. No. 13/618,352, mailed Jul. 7, 2014.

(Continued)

*Primary Examiner* — Ario Etienne
*Assistant Examiner* — Elizabeth Kassa
(74) *Attorney, Agent, or Firm* — Baker Botts L.L.P.

(57) ABSTRACT

A system, apparatus, method, and computer program product that provide a flexible and modular cloud IT service delivery solution model. The apparatus comprises a processor and computer-readable program code that defines a plurality of common capabilities that comprise operations. Those operations are configured to be invoked by a plurality of different processes on a plurality of different containers, and the plurality of common capabilities comprise a service delivery solution when invoked by a process from among the plurality of different processes. Further, the is processor configured to execute the computer-readable program code and to invoke the plurality of common capabilities with each of the plurality of different processes on the plurality of different containers. Accordingly, the apparatus may utilize different containers interchangeably in a plurality of different service delivery solutions and may expand and contract each of the plurality of different service delivery solutions by invoking greater or fewer processes on greater or fewer containers.

27 Claims, 5 Drawing Sheets

(56) References Cited

U.S. PATENT DOCUMENTS

| | | |
|---|---|---|
| 2008/0244577 A1 | 10/2008 | Le et al. |
| 2008/0301024 A1 | 12/2008 | Boss et al. |
| 2010/0131948 A1* | 5/2010 | Ferris .............................. 718/1 |
| 2011/0239039 A1 | 9/2011 | Dieffenbach et al. |
| 2011/0265164 A1* | 10/2011 | Lucovsky et al. ................ 726/7 |
| 2011/0295998 A1 | 12/2011 | Ferris et al. |
| 2012/0030672 A1* | 2/2012 | Zygmuntowicz et al. ....... 718/1 |
| 2012/0174096 A1 | 7/2012 | Conover |
| 2012/0203823 A1* | 8/2012 | Manglik ............... G06F 9/5072 709/203 |
| 2013/0060928 A1 | 3/2013 | Shao |
| 2013/0151680 A1 | 6/2013 | Salinas et al. |
| 2013/0204849 A1 | 8/2013 | Chacko |
| 2013/0211927 A1 | 8/2013 | Kellogg et al. |
| 2013/0227089 A1 | 8/2013 | McLeod et al. |
| 2013/0227560 A1 | 8/2013 | McGrath et al. |
| 2013/0232463 A1* | 9/2013 | Nagaraja et al. ............. 717/101 |
| 2013/0232470 A1 | 9/2013 | Yung |
| 2013/0232498 A1 | 9/2013 | Mangtani et al. |
| 2013/0254755 A1 | 9/2013 | Yousouf et al. |
| 2013/0275596 A1 | 10/2013 | Subramaniam |
| 2013/0297668 A1 | 11/2013 | McGrath et al. |
| 2014/0040883 A1 | 2/2014 | Tompkins |
| 2014/0053150 A1 | 2/2014 | Barnett et al. |
| 2014/0059226 A1 | 2/2014 | Messerli et al. |
| 2014/0089509 A1 | 3/2014 | Akolkar et al. |

OTHER PUBLICATIONS

United States Patent and Trademark Office, Office Action for related U.S. Appl. No. 13/618,352, mailed Dec. 12, 2014.
United States Patent and Trademark Office, Advisory Action for related U.S. Appl. No. 13/618,352, mailed Feb. 25, 2015.
United States Patent and Trademark Office, Office Action for related U.S. Appl. No. 13/618,126, mailed Feb. 18, 2015.
United States Patent and Trademark Office, Office Action for related U.S. Appl. No. 13/618,352, mailed May 12, 2015.
United States Patent and Trademark Office, Office Action for related U.S. Appl. No. 13/973,675, mailed Apr. 11, 2016.
United States Patent and Trademark Office, Office Action for related U.S. Appl. No. 13/618,352, mailed Sep. 4, 2015.
United States Patent and Trademark Office, Office Action for related U.S. Appl. No. 13/618,126, mailed Jul. 17, 2015.
United States Patent and Trademark Office, Advisory Action for related U.S. Appl. No. 13/973,675, mailed Oct. 21, 2015.
United States Patent and Trademark Office, Office Action for related U.S. Appl. No. 14/045,379, mailed Sep. 9, 2016.
United States Patent and Trademark Office, Office Action for related U.S. Appl. No. 13/973,675, mailed Sep. 21, 2016.
United States Patent and Trademark Office, Non-Final Rejection issued in related U.S. Appl. No. 13/973,675, mailed Mar. 26, 2015.
United States Patent and Trademark Office, Notice of Allowance issued in related U.S. Appl. No. 13/618,126 (now U.S. Pat. No. 9,274,843), mailed Nov. 6, 2015.
United States Patent and Trademark Office, Advisory Action issued in related U.S. Appl. No. 13/618,352 (now U.S. Pat. No. 9,311,161), mailed Nov. 17, 2015.
United States Patent and Trademark Office, Notice of Allowance issued in related U.S. Appl. No. 13/618,352 (now U.S. Pat. No. 9,311,161), mailed Dec. 17, 2015.
United States Patent and Trademark Office, Notice of Allowance issued in related U.S. Appl. No. 13/973,675, mailed Dec. 1, 2016.

* cited by examiner

AUTOMATED CLOUD IT SERVICES DELIVERY SOLUTION MODEL

BACKGROUND

The present disclosure generally relates to automating cloud IT services delivery. The disclosed embodiments relate more specifically to a system, apparatus, method, and computer program product that provide flexible and modular cloud IT service delivery solution model.

The information technology (IT) industry is migrating toward automated solutions that are fairly complex and that frequently utilize the point-to-point integration of multiple products and services (e.g., provisioning engines, functional products such as security, external cloud services, etc.) to deliver a complete solution (e.g., a private, hybrid, or public cloud) that addresses a particular market or business need, such as self-service delivery of automated cloud IT services. Frequently, and as a general practice in the industry, such point-to-point integrations are accomplished with light-weight run-book automation (RBA) processes and connectors. Such point-to-point integrations are rapidly gaining acceptance in the industry as a whole. The integration of IT services via RBA-type orchestration technologies, however, presents several challenges.

In purpose-built, multi-product solutions for orchestrating and automating cloud IT services across a breadth of capabilities, the integrity of the products and/or services being delivered is dependent on the integrity of the underlying sets of processes, content, and integrations. Many of those services typically are mission critical and/or chargeable services. And the integrity and supportability of the corresponding processes or process sets must be maintained, managed, and preserved in a production environment without compromising the flexibility of process-based, lightweight integrations and automation so that those processes or process sets can be used in multiple environments.

Each customer environment is unique and may require different variations of processes to match a particular customer's business needs. For example, the process or number of approvals required for the fulfillment of a service request for a first service provider may be different from that of a second service provider, which may be different than the number of approvals required for an enterprise, even though the basic cloud IT service offered by all three generally is the same. That challenge typically is solved by modifying the corresponding process from the process or process set that is delivering the cloud IT service or the multi-product solution as required to suit a particular customer environment or need. That approach, however, is tedious, involves manual intervention, and is prone to errors.

Such errors may break the integrity of the process or process set, which may require potential downtime and/or a thorough re-testing of all other processes in the process or process set to ensure the integrity of the cloud IT service or the multi-product solution being delivered. Moreover, the result of modifying the process or process set is to create one-off implementations, which are difficult to keep track of, manage, and sustain (e.g., fault isolation, updates, diagnosis, etc.). And in an industry that has proliferated a large number of cloud IT services and multi-product solutions that each have a large number of different variations of process-driven integrations that make those services and solutions possible, keeping track of, managing, and sustaining those processes or process sets on an ongoing basis is even more challenging.

Among the specific challenges associated RBA-type orchestration technologies is organizing content related to a cloud IT service into a distributable package. In the context of a cloud IT service delivery solution, the content, processes, connectors, etc. distributed in a particular package are essentially related to and representative of a service. Packaged content, while relatively easy to distribute and configure, loses its context once un-packaged. Accordingly, after content is installed, it is indistinguishable from other processes or content that exists in the environment. In other words, the distributed package is assimilated when it is installed and, therefore, is difficult to manage after that.

Another challenge associated with RBA-type orchestration technologies is that packaged content is easily and necessarily modifiable in the field. Because changes to the content represent changes to the service, managing such changes becomes a crucial and challenging requirement for maintaining the context of the cloud IT service. But even when packaged content correctly represents a cloud IT service, it provides no context for the operations, management, or lifecycle of the cloud IT service it represents (e.g., activation/deactivation, entitlements, metering, changes, content updates, etc.). And without the proper context, the integrity of the cloud IT service being delivered, and even the integrity of the entire solution, will depend on the integrity and manageability of the underlying sets of processes and integrations that are packaged for distribution.

In addition, the entitlement context of a cloud IT service must be maintained. Although packaged content may be access controlled, it has no service context of entitlements. Moreover, packaged content cannot address dependencies, field updateability, or changes related to the support of content packages. And a packaged content set does not maintain state, while a cloud IT service must maintain state in the context of a particular solution (e.g., "is this service active/in-active"). It is those features, among others, that make keeping track of, managing, and sustaining processes and process sets so challenging.

As a result of the foregoing, adding new services or functionality to an existing cloud implementation often involves going back to the drawing board and creating new deployments, new migration exercises, and/or new product customizations, which may take months of planning and may add to build, support, and maintenance costs and concerns. Accordingly, IT administrators may be required to re-deploy existing cloud implementations or to use multiple cloud portals to handle their cloud service management needs. Such requirements compound the challenges associated with managing, maintaining, and updating cloud IT services.

BRIEF SUMMARY

The present disclosure is directed to system, apparatus, method, and computer program product that provide a flexible and modular cloud IT service delivery solution model. The apparatus comprises a processor and computer-readable program code that defines a plurality of common capabilities that comprise operations. Those operations are configured to be invoked by a plurality of different processes on a plurality of different containers, and the plurality of common capabilities comprise a service delivery solution when invoked by a process from among the plurality of different processes. Further, the processor is configured to execute the computer-readable program code and to invoke the plurality of common capabilities with each of the plurality of different processes on the plurality of different containers. Accordingly, the apparatus may utilize different containers interchangeably in a plurality of different service delivery solutions and may expand and contract each of the plurality of different service delivery solutions by invoking greater or fewer processes on greater or fewer containers.

Each of the plurality of different containers may comprise a container specification that specifies each resource upon which the process of that container depends to provide a service. And each container specification may comprise first operations configured to automatically deploy the container by invoking first workflows that install that container in the context of the service delivery solution, second operations configured to provide the service of the container by invoking second workflows that operate on each resource upon which that container depends to provide that service, and third operations configured to be invoked on resource connectors by the second workflows so that the second workflows may operate on each resource upon which the container depends to provide a service. Those resource connectors may be configured to translate a logical implementation of each resource to its corresponding physical implementation.

BRIEF DESCRIPTION OF THE DRAWINGS

Aspects of the present disclosure are illustrated by way of example and are not limited by the accompanying figures with like references indicating like elements.

In those figures, like reference numerals refer to like parts, components, structures, and/or processes.

DETAILED DESCRIPTION

Figure 1:
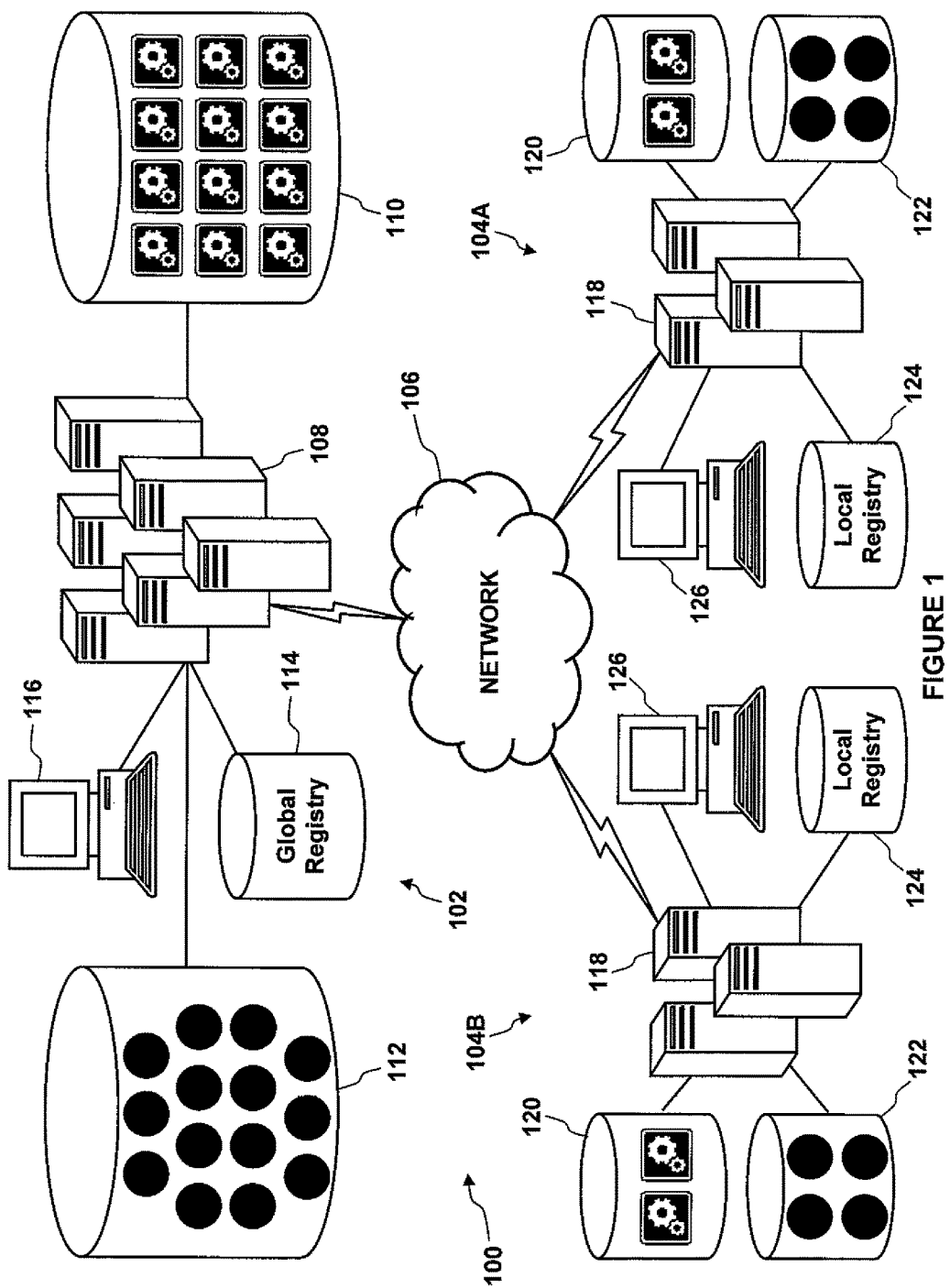
FIG. 1 is a schematic diagram illustrating an example of a communications network according to a non-limiting embodiment of the present disclosure.

As will be appreciated by those of ordinary skill in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like; conventional procedural programming languages, such as the "C" programming language, Visual Basic, Fortran 2003, Perl, COBOL 2002, PHP, ABAP, dynamic programming languages such as Python, Ruby and Groovy; or other programming languages. The program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The system, apparatus, method, and computer program product of the present disclosure provide an exponentially scalable solution model, or framework, that allows for the flexible combination of product capabilities to enable delivery of self-service automated cloud IT services or service offerings as part of a cloud IT service (CITS) delivery solution implementation. A hybrid CITS delivery solution is a solution that enables the definition and metered consumption of cloud IT services or service offerings in a self-service or user-driven manner. The solution model provides a reference architecture for solution administrators and service providers to implement a flexible and modularly expandable and repeatable CITS delivery solution in a single, pre-integrated solution based on the aggregation and integration of a subset of necessary capabilities provided from multiple underlying products. Via such a pre-integrated solution, solution administrators and service providers may offer a variety of self-service cloud IT services or service offerings to customers without the need to re-deploy that solution to update, modify, or expand those services or service offerings.

Turning to the drawings, FIG. 1 illustrates a communications network 100 according to a non-limiting embodiment of the present disclosure. The communications network 100 comprises a solution provider system 102 that is in electronic data communication with two (2) service provider systems 104A and 104B via a network connection 106. It should be understood, however, that the communications network 100 depicted in FIG. 1 is illustrative only and may include any number of solution provider systems 102, any number of service provider systems 104A and 104B, and any number of other systems (e.g., service consumer systems, external resource provider systems, etc.).

The solution provider system 102 is maintained by a solution administrator that offers cloud IT management software and solutions to support different cloud IT service providers' needs. The solution provider system 102 comprises a plurality of solution servers 108, a central container database 110, a central payload database 112, a central registry database 114, and a solution administrator graphical user interface (GUI) 116. And each of the service provider systems 104A and 104B is maintained by a different cloud IT service provider and comprises a plurality of service servers 118, a local container database 120, a local payload database 122, a local registry database 124, and a service provider GUI 126. It should be understood, however, that the solution provider system 102 and the service provider systems 104A and 104B depicted in FIG. 1 are illustrative only and could include any number of each of those network devices 108-126, as well as any number of other network devices (e.g., routers, load balancers, etc.). Because the first service provider system 104A and the second service provider system 104B comprise the same types of network devices 118-126 and operate in a similar manner, any one of those systems 104A or 104B may be referred to generally herein as "a service provider system 104," "the service provider system 104," or some variation thereof (e.g., "that service provider system 104").

Each of the systems 102, 104A, and 104B within the communications network 100 is configured to communicate with each other system via any suitable network connection 106 that supports such communications, such as a WAN connection. Further, the network devices 108-116 in the solution provider system 102 and the network devices 118-126 in each of the service provider systems 104A and 104B are configured to communicate with each other via any suitable wired or wireless connection that supports such communications, such as a LAN connection, a wireless LAN (WLAN) connection, a WAN connection, a cellular network connection (e.g., a Global System for Mobile Communications (GSM) connection, a Code Division Multiple Access (CDMA) connection, a Long Term Evolution (LTE) connection, etc.), or a combination of two or more of those network connections. And any of the network devices 108-126 in any one of those systems 102, 104A, or 104B may communicate with any of the other network devices 108-126 in any of those systems 102, 104A, and 104B via any combination of those network connections.

The solution servers 108 and the service servers 118 each comprise a processor, a memory, and a network interface. The processor may include any number of suitable CPUs that are configured to execute computer program code embodied on the memory and to perform the various functions of those servers 108 and 118 described below. The memory may include one or more types of memory (e.g., ROM, RAM, EEPROM, etc.) as required to store the computer program code executed by the processor and to support the execution of that code. And the network interface may include any number of suitable interfaces (e.g., modems, mobile browsers, wireless Internet browsers, etc.) that are configured to support communications with and between the various network devices 108-126 in the solution provider system 102 and the service provider systems 104A and 104B, as well as with and between the various systems in the communications network 100.

The solution servers 108 also are configured to provide a central service that may be connected to instances of CITS delivery solutions, such as multi-product or sub-product capability CITS delivery solutions implemented at the service provider systems 104A and 104B. That central, network-accessible service maintains a library of available CITS Containers 202 (FIGS. 2 and 3) that may be downloaded via the network connection 106 to the local container database 120 within a service provider system 104 for instantiation and implementation in a hybrid cloud solution after the foundation for that solution has been deployed at that service provider system 104. The central service also maintains a library of payloads 208 (FIGS. 2 and 3) that may be required to support the services or service offerings of a particular CITS Container 202. Those payloads 208 may be downloaded to the local payload database 122 within a service provider system 104 via the network connection 106, and they may be utilized to automatically provision, configure, and deploy resources within the context of a particular multi-product or sub-product capability CITS delivery solution.

Figure 2:
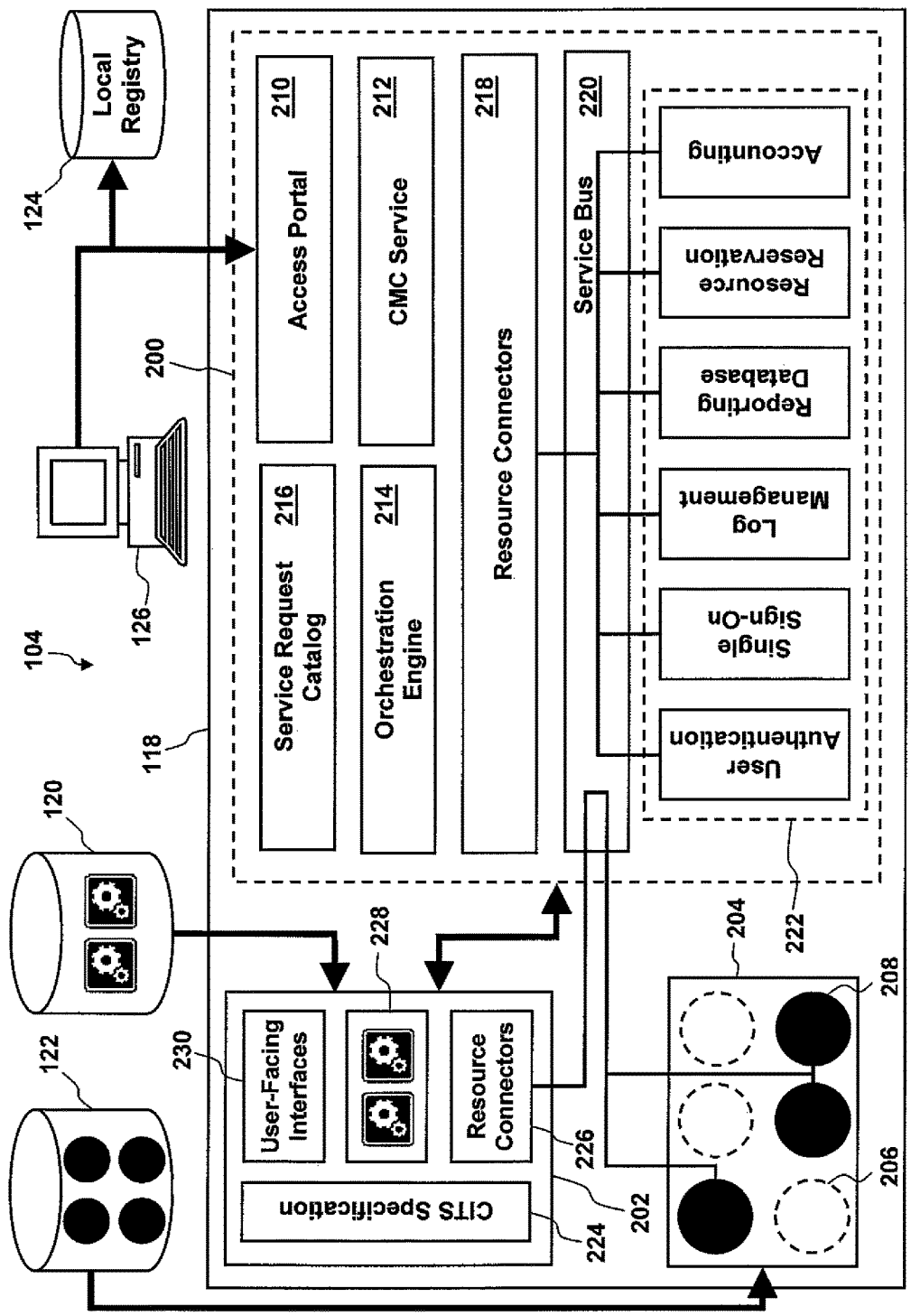
FIG. 2 is a schematic diagram illustrating an example of a service provider system according to a non-limiting embodiment of the present disclosure.

The service servers 118 are configured to provide multi-product or sub-product capability CITS delivery solutions at the service provider systems 104A and 104B. The service servers 118 also are configured to provide a base foundation, or CITS Console 200, that forms the basis of a cloud IT service delivery platform. As depicted in FIG. 2, one or more CITS Containers 202 may be plugged into the CITS Console 200 like a cartridge to define the cloud IT service(s) or service offering(s) provided by the service servers 118. Similarly, each CITS Container 202 may be removed from the CITS Console 200 and replaced with one or more other CITS Containers 202 in a modular manner as required to expand, contract, or otherwise modify the cloud IT services and service offerings provided by a service provider system 104.

Each of the databases 110-114 and 120-124 within the communications network 100 comprises memory that is configured to store data records, files, and other objects for access by a database management system (DBMS). The central container database 110 is configured to store the library of CITS Containers 202 maintained by the solution servers 108; the central payload database 112 is configured to store the library of payloads 208 maintained by the solution servers 108; the central registry database 114 is configured to store a global registry of supported CITS Containers 202 identified by globally unique identifiers (GUIDs), processes or process sets 228 (FIGS. 2 and 3) identified by GUIDs, and container affiliations that are maintained by the solution servers 108; the local container database 120 is configured to store a local library of the CITS Containers 202 downloaded by the service servers 118; the local payload database 122 is configured to store a local library of the payloads 208 downloaded by the service servers 118; and the local registry database 124 is configured to store a local registry of CITS Containers 202 downloaded by the services servers 118 identified by GUIDs, processes or process sets 228 for those downloaded CITS Containers 202 identified by GUIDs, and container affiliations for those downloaded CITS Containers 202. Accordingly, the solution servers 108 and service servers 118 each may comprise a DBMS to manage those libraries and registries.

Each of the GUIs 116 and 126 within the communications network 100 comprises a processor, a memory, an input device, an output device, and a network interface. The processor, memory, and network interface may be similar to those described above with respect to the solution servers 108 and the service servers 118. And the input device may include any number of suitable devices that are configured to receive input from a user (e.g., a keypad, a microphone, a camera, a retinal scanner, a print pad, an electronic receiver, a touch screen, etc.), while the output device may include any number of suitable devices that are configured to output data to a user in a meaningful manner (e.g., a display, a printer, a speaker, etc.). Accordingly, each of the GUIs 116 and 126 may be any suitable network device with each of those components (e.g., a personal computer, a tablet computer, a personal digital assistant (PDA), a smartphone, etc.).

Turning to FIG. 2, the service servers 118 comprise a CITS Console 200, one or more CITS Containers 202, and a payload pool/grid deployment 204 to support the CITS delivery solution provided by a service provider system 104. The CITS Console 200 is configured to provide all of the management and service delivery functions required to implement and operate the CITS Containers 202 such that the common capabilities required to deliver cloud IT services or service offerings via CITS Containers 202 are logically separated from the CITS Containers 202, thereby allowing different CITS Containers 202 to be added to, removed from, and managed with the CITS Console 200 via a common framework. The CITS Containers 202 are configured to define the actual cloud IT services or service offerings provided by the service provider system 104 based on the different artifacts of implementation and contents of each CITS Container 202 plugged into the CITS Console 200. And the payload pool/grid deployment 204 is configured to provide a dedicated and secure pool, or grid, of open slots 206 in which each of the payloads 208 that has been downloaded to the local payload database 122 may be instantiated and invoked by one or more of the CITS Containers 202 plugged into the CITS Console 200.

A single instance of a CITS Container 202 may support a the same type service via a plurality of different, selectable service offerings. Accordingly, the CITS Container 202 is configured to support each of those service offerings. For example, a CITS Container 202 may support a monitoring service. Accordingly, that CITS Container 202 may be configured to support a service offering that performs monitoring of a virtual infrastructure, a service offering that performs monitoring of physical infrastructure, and a service offering that performs monitoring of virtual and physical infrastructure. Each of those service offerings may be offered at different price points. Thus, in a single CITS Container 202, a service consumer may be provided with the option to select from three different service offerings with three different price points, which that service consumer may do via a service request catalog 216 provided by the CITS Console 200.

The CITS Console 200 comprises an access portal 210, a Container Management and Configuration (CMC) service 212, an orchestration engine 214, the service request catalog 216, one or more console resource connectors 218, an intermediary interconnect or service bus 220, and an aggregated set of common capabilities 222. The access portal 210 is configured to provide a self-service user interface via which an authorized user (e.g., the solution administrator or a service administrator at the cloud IT service provider) may access, request, and/or invoke the functionality of the console 200, including the functionality of the CMC service 212. The CMC service 212 is configured to provide the functionality via which such authorized users may set the entitlements, accesses, and other privileges of the access portal 210 and may implement, manage, and/or modify the CITS Containers 202 that are plugged into the CITS Console 200.

Figure 3:
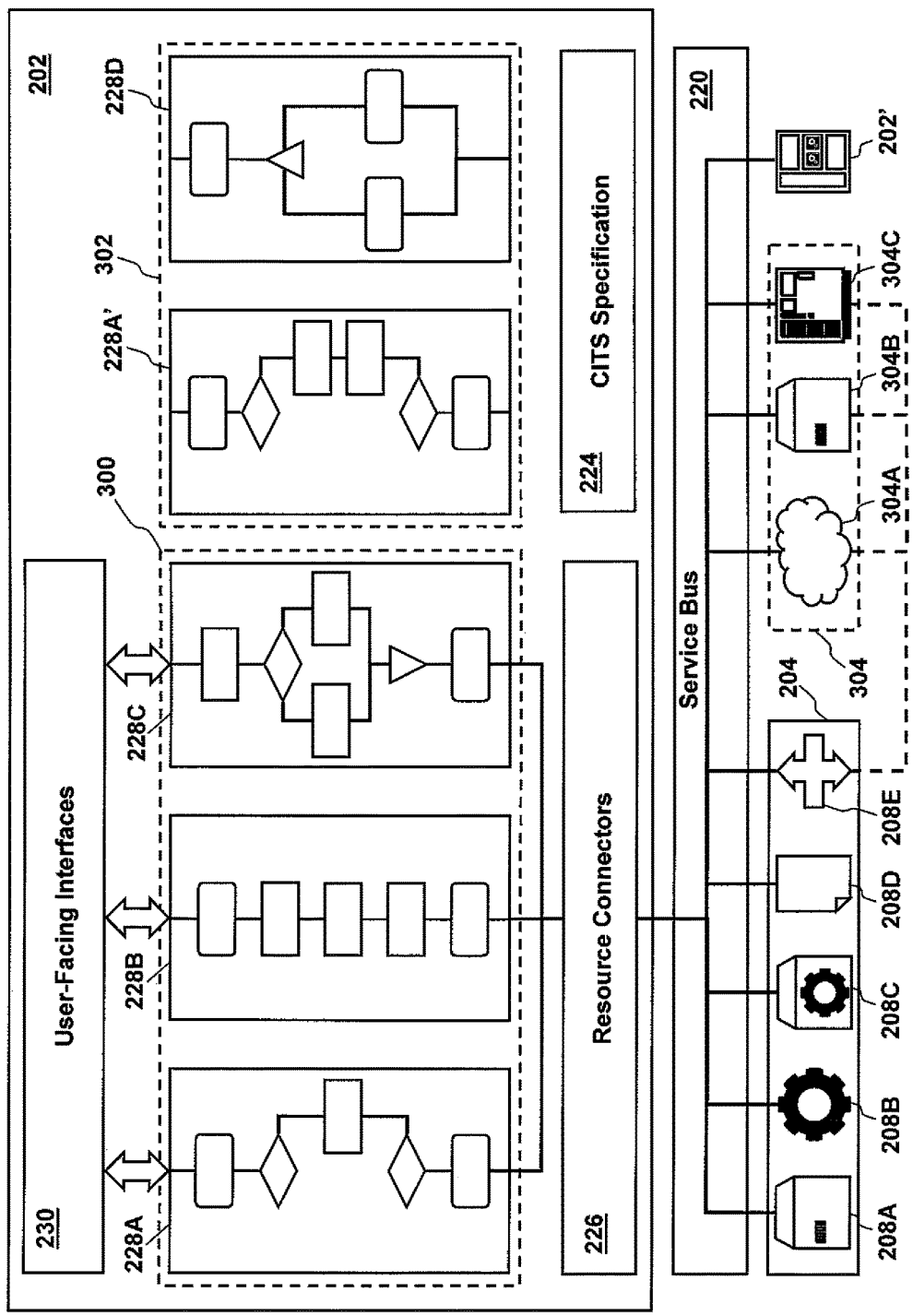
FIG. 3 is a schematic diagram illustrating an example of a cloud service stack according to a non-limiting embodiment of the present disclosure.

The orchestration engine 214 is configured to execute automation scripts, configuration scripts, and/or orchestration workflows provided within CITS specifications 224 of the one or more CITS Containers 202 that are plugged into the CITS Console 200 as required to access, request, and/or invoke the cloud IT services or service offerings of those CITS Containers 202 via the service request catalog 216. The service request catalog 216 is configured to provide a set of user-facing interfaces via which different cloud service consumers, or tenants, may access, request, and/or invoke the cloud IT services or service offerings of the one or more CITS Containers 202 that are plugged into the CITS Console 200 in a self-service manner. And the service bus 220 is configured to provide a common integration point or bus via which the CITS Console 200 may connect to the aggregated set of common capabilities 222 and via which the CITS Containers 202 may connect to instantiated payloads 208 and/or external resources 304 (FIG. 3).

Each of the console resource connectors 218 comprises a logical or abstracted resource definition that provides logical operations for connecting to a common capability from among the aggregated set of common capabilities 222. And the aggregated set of common capabilities 222 comprise those capabilities that are required to enable the functional execution of a cloud IT service or service offering supported by one or more CITS Containers 202. Those capabilities may be provided by one or more IT management products or applications that expose those capabilities 222 via virtualized or neutral operations so that they may be utilized, intelligently orchestrated, or consumed by one or more CITS Containers 202. Those capabilities may be exposed by the service bus 220, and access to those capabilities 222 may be provided by the console resource connectors 218 of the CITS Console 200 as a corresponding logical operations abstraction for each of those capabilities 222. Thus, each of those capabilities may 222 be provided by integrating the corresponding product or application with or within the CITS Console 200 via the service bus 220.

As illustrated in FIG. 2, for example, the aggregated set of common capabilities 222 comprises user authentication capability, single sign-on (SSO) capability, log management capability, reporting database capability, resource reservation capability, and accounting capability. The user authentication capability is configured to provide identity management and authentication functionality (e.g., creating users, adding users, deleting users, authenticating users, etc.) via which all the user identities and authentication may be uniformly managed. The SSO capability is configured to allow a user to sign onto the CITS Console 200 and access all of the various cloud IT services or service offerings of the CITS Containers 202 plugged into that CITS Console 200, including any payloads 208 and/or external resources 304 required to support those services or service offerings, via a single user ID/password combination. The log management capability is configured to log information regarding the CITS Containers 202 that are downloaded to the service provider system 104 (not just plugged into the CITS Console 200) in the local registry database 124. The reporting database capability is configured to compile the data used by the CITS Containers 202 that are plugged into the console 200 for data analysis, report generation, and/or other data services. The resource reservations capability is configured to create reservations for the resources utilized by the CITS Containers 202 that are plugged into the console 200 to deliver cloud IT services or service offerings. And the accounting capability is configured to provide cost modeling and accounting for the services and resources that are consumed by service consumers.

The foregoing examples of common capabilities 222 generally may be utilized across all of the CITS Containers 202 that are plugged into the Console 200 because they may be utilized to support any type of cloud IT service or service offering. Nevertheless, the aggregated set of common capabilities 222 also may comprise additional capabilities that may be utilized to support only certain types of cloud IT services and service offerings. For example, the aggregated set of common capabilities 222 also may comprise a Service Level Agreement (SLA) management capability that is configured to monitor the performance of certain applications against defined sets of service level objectives that have been agreed to by the cloud service provider and the cloud service consumer.

Each of the one or more CITS Containers 202 comprises a CITS specification 224, one or more container resource connectors 226, one or more processes or process sets 228, and one or more user-facing interfaces 230. The CITS specification 224 comprises a declarative model or schema that is configured to provide all of the information required to identify and automatically implement a particular CITS Container 202, including the various operations and/or interfaces required to manage that particular CITS Container 202 and the information required to download and instantiate any payload(s) 208 and/or external resources 304 required to provide the services that are supported by that particular CITS Container 202. Each of the one or more container resource connectors 226 comprises a logical or abstracted resource definition that provides logical operations for connecting a particular CITS Container 202 to the physical implementations of the payloads 208 and/or external resources 304 upon which the service of that particular CITS Container 202 may depend, such as a resource management capability or an external product or service. Each of the one or more process sets 228 is configured to define one or more operation that may be invoked to provide the actual service(s) or service offering(s) that are supported by a particular CITS Container 202, as well as any operations and/or interfaces that may be invoked by the CMC Service 216 to manage that particular CITS Container 202. And each of the one or more user-facing interfaces 230 is configured to provide an operation and/or interface with functionality for service consumers to access, request, and/or invoke the cloud IT services or service offerings supported by a particular CITS Container 202 via the service request catalog 216.

The console resource connectors 218 of the CITS Console 200 and the container resource connectors 226 of the CITS Container 202 may provide similar functionality for connecting to resources, except that the container resource connectors 226 are configured to connect a particular CITS Container 202 to resources that may vary between different CITS Containers 202 (e.g., payloads 208 and/or external resources 304), while the console resource connectors 218 are configured to connect the CITS Console 200 to resources that may be common to all CITS Containers 202 (e.g., the aggregated set of common capabilities 222 and/or external resources 304). Further, the access portal 210 and the service request catalog 216 of the CITS Console 200 may provide similar functionality for users to access, request, and/or invoke the functionality of the CITS Console 200 and CITS Containers 202, respectively, except that the service request catalog 216 provides interfaces for service consumers that may vary between different CITS Containers 202 based on the different user-facing interfaces 230 provided in those CITS Containers 202, while the access portal 210 provides interfaces for service providers that may be common to all CITS Containers 202 based on the common functionality of the CITS Containers 202 and the aggregated set of common capabilities 222 of the CITS Console 200. Providing such common functionality in the CITS Console 200 allows certain functionality to be removed from otherwise different CITS Containers 202 and allows unique functionality to be modularly added to and/or removed from the CITS Console 200 by adding CITS Containers 202 to and/or removing CITS Containers 202 from the CITS Console 200.

A CITS Container 202 is not functional until it is plugged into the CITS Console 200, where it may utilize, intelligently orchestrate, or consume the aggregated set of common capabilities 222 of the CITS Console 200. Flexibility and modularity is provided in the disclosed cloud IT service delivery solution model at least in part by aggregating such common capabilities 222 in the CITS Console 200 and logically separating them from the intelligence, resources, and discreet capabilities of the cloud IT services or service offerings supported by the CITS Containers 202. As a result, CITS Containers 202 and their respective cloud IT services and service offerings may be modularly added to and/or removed from a service provider systems 104 by adding them to and/or removing them from its CITS Console 200. And as those CITS Containers 202 are added to and/or removed from the CITS Console 200, they flexibly expand, shrink, consume, and/or operate the aggregated set of common capabilities 222 provided in the CITS Console 200. As such, the components 210-222 of the CITS Console 200 operate together to form the basis of a cloud IT service delivery platform, while the CITS Containers 202 flexibly and modularly plug into the CITS Console 200 to define the actual cloud IT services and service offerings provided by that cloud IT service delivery platform based on the artifacts of implementation and contents of the CITS Container 202.

When plugged into the CITS Console 200, a CITS Container 202 may connect to certain products, applications, appliances, or external services to support a particular cloud IT service, service offering, or other CITS Container 202. Such products, applications, appliances, external services, and other CITS Containers 202 may reside or depend upon certain physical resources. For example, a management or business application may reside on a physical or virtual infrastructure, or it may exist as a virtual appliance of any type (e.g., a hypervisor). The artifacts of implementation of each CITS Container 202 are provided within each CITS Container 202 and may comprise service interface templates; service definition models or schema; container operations and management interfaces; automation scripts; configuration scripts; files; orchestration workflows that implement such interfaces, scripts, and files; console connectors; logical resources represented by logical resource connectors; and logical resource connectors for connecting logical resources to physical resources or underlying capabilities supporting operations for the logical resource connectors. A CITS Container 202 also may comprise manifest descriptors that enable the corresponding CITS Container 202 to deliver or extend its capabilities or services to include those provided by dependent management or business applications or virtual appliance instances that contain such management or business application as a self-service cloud IT service or service offering.

Utilizing a service provider GUI 126, a cloud IT service provider may access the CMC service 212 via the access portal 210 to implement, manage, and/or modify the CITS Containers 202 that are plugged into the CITS Console 200 and to set the entitlements, accesses, and other privileges for each of the services supported by each of those CITS Containers 202. The services supported by each of those CITS Containers 202 represent a cloud IT service instance, and the CMC service 212 is configured to operate in that cloud IT service instance in the context of a particular hybrid cloud IT service delivery solution instance deployed by a particular service provider. Accordingly, each of the service provider systems 104A and 104B in the communications network 100 may have its own CMC service 212 for implementing, managing, and/or modifying the CITS Containers 202 in that service provider system 104A and 104B.

A cloud IT service provider may implement, or plug in, a CITS Container 202 at the CITS Console 200 of a service provider system 104 via the CMC service 212 by downloading the CITS Container 202 from the solution provider system 102. That download initiates an autonomic process in which the CMC service 212 automatically implements a CITS Container 202 in a hybrid cloud IT service solution by downloading the CITS Container 202 to the local container database 120 from the central container database 110; instantiating the CITS Container 202 in the context of the solution; reading and decomposing the CITS specification 224; executing container automation scripts that automatically invoke a download from the central payload database 112 to the local payload database 122 of any payload(s) 208 that may be required to implement that CITS Container 202; and establishing a connection with the downloaded payload(s) 208 by invoking payload configuration scripts in the CITS specification 224 to automatically configure, or pair, each CITS Container 202 with its corresponding payload(s) 208. In a similar manner, the CMC service 212 also may implement a CITS Container 202 that already has been downloaded to the local container database 120 utilizing payloads 208 that already have been downloaded to the local payload database 122. In the absence of the CMC service 212, such implementation may be performed manually.

Upon implementation in a CITS Console 200, a CITS Container 202 utilizes a declarative model to define the cloud IT services and/or service offerings that it supports. That model also defines the user-facing interfaces 230 required to invoke and operate the cloud IT services and/or service offerings of the CITS Container 202 via the service request catalog 216 and the user-facing interfaces required to manage the CITS Container 202 via the CMC service 212. Those user-facing interfaces 230 are implemented with automation such as orchestration workflows, which provides flexibility for the implementation of those interfaces. Further, those user-facing interfaces 230 are standardized for certain types of cloud IT services or service offerings so that, when they are published to the service request catalog 216 of the CITS Console 202, they will appear the same to service consumers, thereby supporting a common set of user or management interactions that provide uniformity within the CITS Console 200 even when different CITS Containers 202 are implemented. Nevertheless, an extended set of custom interfaces also may be defined for a particular CITS Container 202 by the creator or administrator of that particular CITS Container 202.

A CITS Container 202 automatically publishes its set of user-facing interfaces 230 to the service request catalog 216 of the CITS Console 200 when it is implemented in the CITS Console 200, such that the user-facing interfaces 230 are made available to service consumers through the service request catalog 216 upon implementation of the CITS Container 202. Such user-facing interfaces 230 may be presented to service consumers, for example, as selectable options on a display at a service provider GUI 126, and they may graphically represent the cloud IT services and/or service offerings that are available for consumption via a particular CITS Container 202. When such user-facing interfaces 230 are selected/invoked by a service consumer, a set of orchestration workflows contained within the CITS specification 224 of the CITS Container 202 associated with that interface are invoked to enable that CITS Container 202 for run-time execution. Those workflows are consumed or executed within the orchestration engine 214 of the CITS Console 200 to initiate the cloud IT service or service offering that corresponds to the one selected/invoked user-facing interface 230.

The aggregated set of common capabilities 222 provided at the CITS Console 200 may be consumed by the orchestration workflows contained within the CITS specification 224 of any CITS Container 202 as part of the implementation of the cloud IT service or service offering that it supports. In addition, a CITS Container 202 also may depend upon and/or perform operations defined for logical resources as part of the implementation of a cloud IT service or service offering. Accordingly, a CITS Container 202 may or may not comprise logical resources that are accessible via container resource connectors 226, depending on the type of cloud IT service or service offering that it supports and whether that cloud IT service or service offering depends upon any type of resource or resources.

Logical resources represent physical resources (e.g., products, appliances, physical machines, etc.) and/or or functional capabilities (e.g., services, managed objects, datacenter elements such as backup, monitoring, etc.) and define the operations that may be performed on the physical resources and/or functional capabilities that they represent. In the CITS Console 200, logical resources are represented by console resource connectors 218. And in a CITS Container 202, logical resources are represented by container resource connectors 226.

An example of a logical resource that may be represented by a console resource connector 218 or a container resource connector 226 is a virtual machine. The physical implementation of a virtual machine may be a virtual machine for vmware hypervisor, a physical virtual machine for hyper-v hypervisor, or a physical virtual machine for elastic computing cloud ($EC^2$) services. A disk is also an example of a logical resource that may be represented by a console resource connector 218 or a container resource connector 226, and its physical implementation is a disk manager appliance.

Although the logical implementations of such resources generally are the same from one system to another, the physical implementations of those resources may vary. As a result, the same resource may require different translations from its logical implementation to its physical implementation depending on the system in which that resource resides. Accordingly, a single CITS Container 202 may comprise different container resource connectors 226 that represent the same logical resource but that provide different translations so that the subject CITS Container 202 may be utilized with a plurality of different systems, resources, and/or CITS Consoles 200. By contrast, the CITS Console 200 may have a single console resource connector 218 for each resource upon which it depends because, unlike a CITS Container 202, it does not need to be configured to be utilized with a plurality of different systems. Instead, a CITS Console 200 may be provided as a customized CITS delivery solution by sizing and configuring that CITS delivery solution to operate on a particular service provider system 104, while CITS Containers 200 may be utilized interchangeably between different CITS Consoles 200, regardless of the service provider system 104 on which they have been deployed.

The logical resources and functional capabilities represented by container resource connectors 226 may be provided as payloads 208 and/or external resources 304. They also may be provided by the CITS Console 200. For example, a container resource connector 226 may represent the user authentication capability of the CITS Console 200, wherein the container resource connector 226 for that capability enables the orchestration workflows within CITS Container 202 to authenticate users by performing the operations defined by that container resource connector 226.

For each resource that is represented by a container resource connector 226 in a CITS Container 202 and that is required to support a particular service or service offering, the orchestration engine 214 of the CITS Console 200 may consume or execute the orchestration workflows within the CITS specification 224 of that CITS Container 202 to invoke the resource reservation capability of the CITS Console 200. That resource reservation capability, which is part of the aggregated set of common capabilities 222 of the CITS Console 200, initiates a request for the resources that are represented by the subject container resource connectors 226.

The orchestration engine 214 of the CITS Console 200 also may consume or execute the orchestration workflows within the CITS specification 224 of a particular CITS Container 202 to perform operations on the container resource connectors 226 provided within that CITS Container 202 so that the container resource connectors 226 may be implemented for specific resource providers via the service bus 220 of the CITS Console 200. Thus, the orchestration engine 214 of the CITS Console 200 not only may consume the aggregated set of common capabilities 222 of the CITS Console 200 utilizing the orchestrated workflows in the CITS specification 224 of a CITS Container 202, it also may connect the CITS Container 202 to payloads 208 and/or external resources 304 utilizing those orchestrated workflows to perform operations on the container resource connectors 226 contained within that CITS Container 202.

Although a particular container resource connector 226 within a CITS Container 202 may utilize different translations or implementations for different resource providers based on the different resource provider systems in which the corresponding physical resource resides, utilizing container resource connectors 226 at the corresponding CITS Container 202 and performing the operations of the subject resources at the logic layer enables the orchestrated implementations of those logical resources to independently of who the resource provider is or where the resource is located. And rather than being provided in the console resource connectors 218 of the CITS Console 200, the logical translation abstractions required by a particular CITS Container 202 also may be provided in that CITS Container 202. In either instance, as long as the translation abstraction is available, the orchestrations of the CITS Container 202 may operate at the logic layer independently of who the resource provider is or where the resource is located. Accordingly, the implementation of cloud IT services and/or service offerings via the disclosed embodiments not only is modular, it also is portable and repeatable.

When the resources upon which a CITS Container 202 depends may be implemented utilizing the components 118-126 of the service provider system 104, those resources may be downloaded and instantiated as payloads 208 in the payload pool/grid deployment 204. The payload pool/grid deployment 204 comprises a plurality of open slots 206 where a payload 208 may be configured for utilization by one or more CITS Containers 202. In FIG. 2, for example, three (3) payloads 208 have been deployed for the CITS Container 202. And in FIG. 3, for example, five (5) payloads 208 have been deployed for the CITS Container 202.

Although only one CITS Container 202 is depicted in FIGS. 2 and 3, any number of additional CITS Containers 202 also may be plugged into a CITS Console 200. And by virtue of pooling payloads 208 in the payload pool/grid deployment 204, a single instance of any one (1) of those payloads 208 may be utilized by a plurality of CITS Containers 202. Nevertheless, separate instances of a payload 208 also may be provisioned for utilization by separate CITS Containers 202, if required.

To deploy and configure a payload 208, the orchestration engine 214 of the CITS Console 200 utilizes the orchestration workflows of that CITS Container 202 to perform operations that initiate the download, instantiation, and configuration of those payloads 208. For example, automation scripts may be invoked that automatically download any payload(s) 208 that may be required to implement that CITS Container 202 from the central payload database 112 to the local payload database 122 and to instantiate those payload(s) in the payload pool/grid deployment 204. Payload configuration scripts also may be invoked to automatically configure, or pair, each CITS Container 202 with its corresponding payload(s) 208 and/or external resources 304. Such a connection is established autonomically by the CITS Console 200 utilizing the container resource connectors 226 of the corresponding CITS Container 202 together with the automation scripts, configuration scripts, orchestration workflows, and other information in the CITS specification 224 of that CITS Container 202.

The CITS Console 200 and/or its associated payload(s) 208 may depend on resources that are provided by a third-party resource provider as external resources 304, such as when sufficient resources are not available at the service provider system 104. Those resources may be physical resources or logical resources. For example, a CITS Container 202 may depend upon a physical resource provided by a third-party resource provider to host a logical resource, and a CITS Container 202 may depend upon a logical resource provided by a third-party resource provider. In the former instance, the logical resource may be deployed and configured as software bundles in a similar manner as described above with respect to payloads 208. And in the latter instance, container resource connector 226 may be utilized to connect the CITS Console 202 to the target resources without the need to invoke automation and configuration scripts to install that logical resource on that physical resource. In either instance, the resource reservation capability of the CITS Console 200 may be utilized to reserve the target resources and orchestration workflows may be invoked to issue physical commands to the corresponding third-party resource providers that may be carried out to deploy and configure the target resources. In response to those commands, the third-party resource provider may return a "completed" or "failed" status based on whether those command results in the successful deployment and configuration of the target resources.

Regardless of whether a resource is provided as or implemented on the components 118-126 of the service provider system 104 or provided as or implemented on an external resource 304 provided by a third-party resource provider, that resource may be connected to a CITS Container 202 via the service bus 220 utilizing a container resource connector 226. As an alternative to connecting a CITS Container 202 to a resource indirectly via the service bus 220, resources also may connect a CITS Container 202 to those resources. And as yet another alternative, a CITS Containers 202 may connect to such resources via standard internet protocols. Accordingly, the container resource connectors 226 in each CITS Container 202 may be configured to provide one or more of those types of connections for any payload 208 and/or external resource 304 upon which that CITS Container 202 and/or its associated payload(s) 208 may depend. It also is possible that a CITS Container 202 and/or its associated payload(s) 208 may not depend upon any resources other than those of the CITS Console 200, in which case no connections are required to any resources, such that the CITS Container 202 is self-sustaining and fully operational (other than its reliance on certain operations of the CITS Console 200) when downloaded from the solution provider system 102.

A cloud IT service provider may manage the CITS Containers 202 downloaded to a service provider system 104 (not just those plugged into the CITS Console 200) via the CMC service 212 by invoking various Standard Operations that are supported by the CITS Containers 202 (e.g., Tables 2-4); by collecting, tracking, and recording usage metrics and events associated with the CITS Containers 202 and the services supported by those CITS Containers 202; and by generating a journaled log of changes to and the current state of the CITS Containers 202. Further, a cloud IT service provider may modify one or more of the downloaded CITS Containers 202 by updating one or more of the downloaded CITS Containers 202 when changes to one or more corresponding CITS Containers 202 are made by the solution administrator that maintains the solution provider system 102 so that the CITS Containers 202 in the local container database 120 remain synchronized and up to date with the corresponding CITS Containers 202. A cloud IT service provider also may modify one or more of the CITS Containers 202 that is plugged into the CITS Console 200 by creating one or more custom operations that may be invoked by one or more of the CITS Containers 202; by modifying one or more existing processes or process sets 228 in one or more of the CITS Containers 202; by creating one or more new processes or process sets 228 in one or more of the CITS Containers 202; by adding one or more processes or process sets 228 to one or more of the CITS Containers 202; and/or by removing one or more processes or process sets 228 from one or more of the CITS Containers 202.

When a cloud IT service provider synchronizes CITS Containers 202 in the local container database 120 of the service provider system 104 with CITS Containers 202 in the central container database 110 of the solution provider system 102, the CITS Containers 202 in the local container database 120 may be updated to reflect changes in a newer version of the same CITS Container 202 in the central container database 110 or to reflect changes in a different CITS Container 202 in the central container database 110 that has similar payload dependencies. Similarly, the CITS Containers 202 in the central container database 110 may be updated to reflect changes to corresponding containers in the local container database 120 of one of the service provider systems 104A or 104B. Changes to CITS Containers 202 in the central container database 110 may, for example, correspond to updates generated by the solution administrator that offers IT management software via the solutions provider system 102 and that are intended for proliferation to all of the service provider systems 104A and 104B in the communications network 100, while changes to CITS Containers 202 in the local container database 120 may, for example, correspond to custom operations or a new processes or process sets 228 generated by the cloud IT service provider that maintains the service provider system 104 and that are intended for use within that service provider system 104. In the latter example, the custom operations and/or new processes or process sets 228 may subsequently be proliferated to all of the service provider systems 104A and 104B in the communications network 100 if their corresponding CITS Container 202 is registered with the solutions provider system 102 via the CMC service 212.

When a cloud IT service provider creates a custom operation or a new process or process set 228, that cloud IT service provider may utilize the CMC service 212 to upload that operation or process or process set 228 to the solution provider system 102 for testing, certification, and support approval. After the custom operation or new process or process set 228 is tested for potential problems, certified for use with a particular CITS Container 202, and approved for operation with the CITS Console 200, it is added to the global registry, together with its container affiliation. Such certified and approved processes or process sets 228 are identified in the global registry with unique process GUIDs, which then are provided in the CITS specification 224 of any CITS Container 202 that comprises those processes or process sets 228. Similarly, CITS Containers 202 may be identified in the global registry with unique container GUIDs.

If a container GUID is stored in the global registry, then the processes or process sets 228 within the corresponding CITS Container 202 are considered to be supported, valid processes or process sets. And if the container GUID is not registered in the global registry, then the processes or process sets 228 within the corresponding CITS Container 202 are considered to be unsupported processes or processes sets. Nevertheless, unsupported processes or process sets 228 still may be invoked by a CITS Container 202. The same is true for the CITS Container 202 itself. But maintaining such a registry in the central registry database 114 helps ensure that the functional/management applications on which a container instance depends are available and correctly configured, which helps ensure the integrity of the corresponding CITS Container 202 and the services supported by that CITS Container 202.

Further, a cloud IT service provider may set the entitlements, accesses, and other privileges for each of the services that are supported by each of the CITS Containers 202 in the service provider system 104 via the CMC service 212 by writing them to the CITS specification 224 for the each of the CITS Containers 202. Accordingly, the access portal 210 may be configured to provide consumers, or tenants, of the cloud IT service provider's services with access to those services based on the settings in the CITS specification 224. And those entitlements, accesses, and other privileges may be set in the context of the particular services that are supported by each of the CITS Containers 202 in the service provider system 104, which provides the system-by-system service context for the content of those CITS Containers 202. Moreover, any content added to those CITS Containers 202 (e.g., new processes or process sets 228) will automatically inherit those entitlements, accesses, and other privileges by virtue of their being written in the CITS specifications 224 of those CITS Containers' 202A-202C.

The CITS specification 224 comprises a representation of the object schema definition for the corresponding CITS Container 202. That representation may, for example, be based on a specified standard, such as the Extensible Markup Language (XML) standard, while the object schema definition may be defined in a schema definition file, such as an XML schema definition file (.xsd file). The CITS specification 224 comprises references to and descriptions of the specified operations, automation scripts, configuration scripts, and/or orchestration workflows that are utilized by the CMC service 212 to perform Management Operations (e.g., Table 2) and Service Operations (e.g., Table 3), such as downloading, instantiating, and configuring the payloads 208 and/or external resources 304 (FIG. 3) that are required to support the services or service offerings of the CITS Container 202. And the object schema definition comprises the general specification of the CITS Container 202.

In addition to the CITS specification 224, each CITS Container 202 comprises an active pool 300 of processes or process sets 228A and a passive pool 302 of processes or process sets 228, as illustrated in FIG. 3. Accordingly, the CITS specification 224 also includes the GUIDs that are utilized by the CMC service 212 to map CITS Container 202 operations to processes or process sets 228 and to track the processes or process sets 228 that are in the active pool 300 and passive pool 302. And because each instance of a CITS Container 202 in a solution context has a unique CITS specification 224, each instance of a CITS Container 202 in a solution context is based on a correspondingly unique object schema definition.

A solution administrator and/or container developer may utilize a Container Editor Tool that operates with the CMC service 212 to modify a CITS specification 224, as well as the descriptors within that CITS specification 224. Examples of the notations, tags, and attributes that may be provided in the CITS specification 224 and edited with the Container Editor Tool are listed below in Table 1.

TABLE 1

Object Schema Descriptors

| Descriptor | Description/Function |
|---|---|
| Container GUID | Unique identifier for container |
| Name | Name of container |
| Date | Date container was certified/released |
| Version | Version Information |
| Patch Level | Current patch level |
| Container Type | Type of service represented by container (e.g., service, resource, etc.) |
| Supported Solution Name(s) | Description of cloud IT service solution supported by container |
| Cloud Service Description | Description of cloud IT service supported by container |
| Functionality Description | Detailed description of service provided/enabled with container |
| Standard Operations | Operations that must be provided by a container |
| Custom Operations | Operations that may optionally be created for a container as defined by the creator |
| Management Operations | Operations that may be utilized to manage a CITS Container |
| Service Operations | Operations that may be utilized to manage the services or service offerings of a CITS Container |
| Resource Operations | Operations that may be utilized to manage the resources required by a CITS Container |
| Custom/Service Operations | Operations that may optionally be created for a container as defined by the creator |
| Operations Enabled | List of operations supported by container |
| Payload Dependency List | List of Appliance/Workflow/Application/Service dependencies for preconfigured payloads |
| Service Type Template | Standardized service template based on type of cloud IT service (e.g., service, resource, etc.) |
| Process GUID | Unique identifier for processes or process sets |
| Active GUIDs | List of all active processes or process sets currently utilized in container |
| Passive GUIDs | List of all non-active processes or process sets included in container |
| Container Dependency List | List of container compatibility with/ dependency on other containers |
| Dirty Bit/Support Bit | Maintained bit for determining support |
| State Information | Current state of container (e.g., Downloaded, Installed, Modified, Registered, Active, Inactive, Updated, Unsupported, etc.) |
| Change/History Log | Log of changes wit date/time stamp for modifications |
| Connector/Interface List | List of connector, adapter, and interface details, including version |
| Documentation | Documentation for container (URL or self-contained) |
| Locale | Language Supported |
| Contact Information | Creator/support contact information |

The Dirty Bit/Support Bit referenced in Table 1 is a resettable "support bit" or "dirty bit" that is utilized to maintain the integrity of the CITS Container 202. Modifications made according to rules or allowed policies do not effect the Dirty Bit/Support Bit, while modifications that may compromise the supportability of the container contents may trigger the Dirty Bit/Support Bit. Thus, the Dirty Bit/Support Bit may be reset to a default value on new installation, and any subsequent modifications to the CITS Container 202 may trigger the dirty bit to a non-default value that denotes the type of integrity breech that the CITS Container 202 has sustained.

The Service Type Template referenced in Table 1 defines the declarative model, format, and operations of the user-facing interfaces 230 that are published to the service request catalog 216 for a particular type or category of cloud IT service or service offering supported by the subject CITS Container 202. The model, format, and operations defined by each Service Type Template are standardized for each type or category of cloud IT service or service offering so that the user interactions conducted with the CMC service 212 appear the same to a user regardless of the payloads 208 or the other products, workflows, services, appliances, applications, and/or devices upon which a CITS Container 202 may depend to provide that type of cloud IT service. For example, a CITS Container 202 may be configured to provide a security service, but different implementations or instances of that CITS Container 202 may implement the service template model with different processes or process sets 228 that depend on different target resources based on the same declarative model and template for the security service. Despite those different instances of the CITS Container 202 utilizing different target resources or workflows to provide that security service, the interfaces and operations provided by the user-facing interfaces 230 of the CITS Container 202 will remain the same so as to maintain the consistency of user interactions at the CMC service 212.

The Service Type Template model may be captured as an XML file within the user-facing interfaces 230 of the subject CITS Container 202. In the alternative, the Service Type Template may be implemented as a link to an external XML template file that is managed by the CMC service 212. In the latter configuration, the CMC service 212 operates as an interface between the standard "Service Type Template and one or more cloud IT services or service offerings that implement that standard Service Type Template so that the user interactions at the CMC service 212 remain consistent. Moreover, different CITS Containers 202 that support different services or service offerings also may specify the same standard Service Type Template to further maintain the consistency of user interactions at the CMC service 212.

Also in Table 1, the Standard Operations and Custom Operations are captured as automation processes provided within the subject CITS Container 202. All CITS Containers 202 support a set of Standard Operations that are required for compliance with a container standard that is maintained and owned by the solution administrator that maintains the solution provider system 102. That container standard defines the rules and allowed policies that determine the state of the Dirty Bit/Support Bit (e.g., ON=supported and OFF=unsupported) based on whether a modification effects the integrity of the CITS Container 202. Such Standard Operations may be sub-divided into Management Operations, Service Operations, and Resource Operations, which also are referenced in Table 1. Examples of such Management Operations, Service Operations, and Resource Operations are listed below in Tables 2, 3, and 4, respectively.

TABLE 2

Management Operations

| Command | Operation |
|---|---|
| List_Operations | Lists all operations supported by a container, including standard and custom operations |
| Install/Uninstall | Installs/uninstalls a CITS Container in a solution context |
| Register/Unregister | Registers/unregisters a CITS Container in the local registry |
| Activate/Deactivate | Activates or deactivates a processes or process sets in context of a live environment |
| Patch | Patches CITS Container with additional content |
| Upgrade | Upgrades a CITS Container to newer version with the local solution context |
| Rollback | Rolls a CITS Container back to a previous version or, optionally, a specified version by undoing any changes made to that version |
| Reset | Resets to "factory" default settings |
| Sync | Enables content from passive pool of one CITS Container to be synchronized with that of another CITS Container |
| Download_Payload | Runs automation scripts to automatically download payload(s) required for a container |
| Configure_Paylaod | Runs configuration scripts to automatically configure, or pair, a container with its payload(s) |
| Activate_Payload | Activates payload(s) in context of a live environment |
| Add/Remove_Entity | Adds or removes service provider and/or tenant |
| Status | Queries and returns current status of container/service, processes, and content |
| List_Content | Produces list of all content details contained within a container |
| List_Service_Descriptions | Lists all services provided/supported by container |
| Query_Data | Enables query of descriptor data |
| Add/Remove_Object | Adds or removes processes or process sets, connectors, scripts, PowerPacks, custom container operations, etc. |
| Configure_Container | Enables the configuration of the container, connector, or other content for container to become operational |
| Get_Metered_Data | Gets data associated with metering of service |
| Set_Entitlement | Adds or removes entitlement for customer or tenant to container |
| Set/Unset | Enables container to be put in/ taken out of maintenance mode |
| Get_Version | Gets container version |
| Add/Remove_Operation | Adds or removes container operations |

TABLE 3

Service Operations

| Command | Operation |
|---|---|
| Test_Consumer | Tests the services or service offerings of a CITS Container from a customer or tenant perspective |
| Test_Admin | Tests the services or service offerings of a CITS Container from an administrator perspective |
| Instantiate | Creates an instance of a service or service offering of a CITS Container so that it is ready for activation |
| Configure | Configures an instantiated service or service offering of a CITS Container |
| Initiate | Performs initiation activities associated with initial setup of the service or service offering of a CITS Container |
| Activate | Activates an instantiated service or service offering of a CITS Container |
| Deactivate | Deactivates an activated service or service offering of a CITS Container |
| Remove | Deletes and de-registers a service or service offering of a CITS Container |
| Test | Validates an instantiated and configured service or service offering for integrity and functional use |
| Collect | Collects usage metrics from the services or service offerings of a CITS Container |

TABLE 3-continued

Service Operations

| Command | Operation |
| --- | --- |
| Get_Cost_Estimate | Gets service costing information or cost of service resource(s) from multiple resource providers or payloads |
| Set_Overload_Tenant | Sets a process GUID in a CITS Container to overload another process GUID in the same CITS Container |
| Set/Get_QoS | Sets or determines QoS level specifications for CITS Container (QoS levels may be arbitrary or as defined in CMC service) |
| Get/Set_QoS_Route | Sets user sessions route for runtime redirection for any user requested resource or user activity or action performed by one or more processes within a CITS Container based on QoS levels specified for that CITS Container and a user's user ID, group ID, tenant ID, and/or target resource specification or tags |
| Get/Set_Transactional_Cost | Sets and determines transactional costs for each workflow or process or process set within a cloud IT service, or for the whole CITS Container |
| Get/Set_Completion_Status | Sets and determines the state or completion status of a user's activity associated with a process or process set within a CITS Container |

TABLE 4

Resource Operations

| Command | Operation |
| --- | --- |
| Reserve | Creates a new reservation for a provisioned resource and reserves that resource from a start date to an end date |
| End | Reservation Ends a reservation |
| Extend | Reservation Extends the reservation date for a resource or resources past the original requested end date |
| Change_Reservation | Changes the reservation parameters for a resource or resources (e.g., CPUs, hard disk capacity, etc.) |
| Manage_Reservation | Manages the state of the reservation for a resource or resources (e.g., stop, start, resume, activate, deactivate, etc.) |
| Return_Reservation | Returns an existing reservation for a currently provisioned resource |
| Get_All | Gets all of the usage data related to a resource or resources (e.g., resource owner, cost center, utilization data, current configuration, etc.) |

The Management Operations listed in Table 2 may be utilized by the CMC service 216 to manage a CITS Container 202, such as by installing, registering, configuring, activating, and deactivating a CITS Container 202. The Service Operations may be utilized by the CMC service 216 to manage, or by service consumers to consume, the services or service offerings that are supported by such a CITS Container 202, such as by initiating, configuring, testing, and activating those services or service offerings. And the Resource Operations may be utilized by the CMC service 216 to manage the resources that are required to support those services or service offerings, such as by reserving, provisioning, and monitoring those resources.

In Table 2, the Install/Uninstall operations invoke workflows in a CITS Container 202 that automatically install and configuration that CITS Container 202 in a CITS Console 200, or that remove, or uninstall that CITS Container 202 from a CITS Console 200. The implementation of those workflows may be specific to each instance of a CITS Container 202. And after a particular CITS Container 202 is instantiated in a CITS Console 200, it is registered in the local registry of a service provider system 104 before the CMC service 216 of that service provider system 104 may be utilized to perform other Management Operations on that particular CITS Container 202.

The Register/Unregister operations referenced in Table 2 invoke workflows in an installed CITS Container 202 that register that CITS Container 202 in the local registry of a service provider system 104 and notify the CMC service 216, or that unregister that CITS Container 202. The Register operation may be called as a part of the workflows of the Install operation, or as a standalone operation. And after a particular CITS Container 202 is registered in the local registry, the CMC service 216 may invoke other Management Operations provided within that CITS Container 202.

The Activate/Deactivate operations referenced in Table 2 invoke management workflows in a CITS Container 202 that mark that CITS Container 202 as active (i.e., ready for use) in the local registry of a service provider system 104, or that mark an active CITS Container 202 as inactive. The Activate operation also may call the Service operation to activate the services or service offerings of that CITS Container 202. Although the Deactivate operation may invoke workflows to mark an activated CITS Container 202 as inactive, that CITS Container 202 may remain registered in the local registry so that it may be re-activated by calling the Activate operation again at a later point in time.

The Patch operation referenced in Table 2 invokes workflows in a CITS Container 202 that add content to that CITS Container 202. The Upgrade operation referenced in Table 2 invokes workflows in a CITS Container 202 that upgrade the lifecycle of that CITS Container 202. Accordingly, both the Patch and Upgrade operations may be utilized to perform routine maintenance on a CITS Container 202. And the Rollback operation referenced in Table 2 invokes workflows in a CITS Container 202 that roll that CITS Container 202 back to a previous version, which may be either a version immediately preceding the version that is being rolled back or a previous version that has been specifically identified. Accordingly, the Rollback operation may be utilized to undo an changes performed by the Patch and/or Upgrade operations, as well as any changes that a container developer may make.

The Sync operation referenced in Table 2 invokes workflows in a CITS Container 202 that cause the contents of a first instance of that CITS Container 202 to be updated and/or synchronized with that of a second instance of that CITS Container 202, such that the same content may be maintained in different instances of the same CITS Container 202 or in different CITS Containers 202 with similar dependencies. Rather than requiring content to be downloaded from the first instance of the CITS Container 202, moved and/or modified, and then uploaded into the second instance of the CITS Container 202, the Sync operation combines those discreet operations into a single, autonomic operation. The Sync operation also facilitates the supportability of the content because it allows a cloud IT service provider to move and/or modify the state of content from a local instance of a CITS Container 202 to a remote instance of the CITS Container 202 for testing, certification, and approval. Moreover, it allows a cloud IT service provider to upload registered content from a remote instance of a CITS Container 202 to a local instance of the CITS Container 202 for inspection and modification. The Sync operation also allows the contents of two local instances of CITS Containers 202 to be synchronized. Any sync operation that may result in conflicts between the contents of different instances of a CITS Container 202 may be referred to an administrator at the solution provider system 102 for resolution.

In Table 3, the Instantiate operation invokes workflows in a CITS Container 202 that create an instance of a service or service offering that is supported by that CITS Container 202 and publish the instantiated service or service offering to the service request catalog 216. After an instance of the service or service offering has been created, it must be activated by the Activate operation before service consumers may request and consume the subject service or service offering, and before additional Service Operations may be performed on the service or service offering.

The Configure operation referenced in Table 3 invokes workflows in a CITS Container 202 that configure or re-configure a service or service offering that is supported by that CITS Container 202, the resources upon which that service or service offering depends, the container resource connectors 226 for those resources, and all associated configurations required to make that service or service offering operational. The Configure operation also may invoke certain post-operational workflows, such as workflows that configure a monitoring application to monitor the performance of that service or service offering after it is operational.

The Activate operation referenced in Table 3 invokes services workflows in a CITS Container 202 that enable a service or service offering that is supported by that CITS Container 202 to be published to the service request catalog 216 for self-service consumption via the Access Portal 210. The Activate operation also marks that service or service offering as active (i.e., ready for use). The Deactivate operation referenced in Table 3 invokes workflows that disable, or deactivate, that service or service offering and remove it from the service request catalog 216 so that it will not be available for self-service consumption, although it may remain on a CITS Container 202. And the Remove operation referenced in Table 3 invokes workflows that deactivates a service or service offering and deletes it from its CITS Container 202. Accordingly, the workflows of the Deactivate operation may be part of the Remove operation.

The Test operation invokes workflows in a CITS Container 202 that validate the integrity of a service or service offering that is supported by that CITS Container 202. For example, a service or service offering may be placed in a test mode so that it is operational, but is not published in the service request catalog 216 and, therefore, cannot be consumed by service consumers. A successful result of such a test would ensure that the service or service offering is in ready, working condition, while any unsuccessful result would allow a solution administrator to take any corrective actions necessary to bring the service or service offering into a ready, working condition.

The Set_Overload_Tenant operation referenced in Table 3 invokes workflows in a CITS Container 202 that cause a process GUID in that CITS Container 202 to overload another process GUID in the same CITS Container 202 based on a tenant ID to which a particular user belongs. In other words, the user entitlements for a first process or process set 228 identified with a first process QUID will be set, or overloaded, by a second process or process set 228 with a second process QUID to prevent users with a particular tenant ID from invoking the first process or process set 228 while, at the same time, allowing the users with that tenant ID to invoke the second process or process set 228. Such processes or process sets 228 may be mutually exclusive processes or process sets 228, but they may be presented to the different users as the same process or process set 228 via the user interface of the CMC service 212 to maintain the consistency of user interactions at the CMC service 212, such as when the CITS Container 202 is deployed in a multi-tenant cloud solution.

For example, a first tenant in a multi-tenant deployment may require a default process or process set 228A with one level of approval, and a second tenant in that multi-tenant deployment may require an alternative process or process set 228A' with two levels of approval. But both of those processes or process sets 228A and 228A' may be presented to those tenants' users as the same approval process via the user interface of the CMC service 212 (e.g., an approval process). Thus, the alternative process or process set 228A' may overload the default process or process set 228 with a Set_Overload_Tenant operation so that, when a user with a tenant ID corresponding to the second tenant requests that approval process, that user's request is directed from the default process or process set (i.e., the overloaded process set) 228A to the alternative process set 228A (i.e., the overloading process set). The redirection of that request is performed in the background so that it is transparent to the user. By contrast, when a user with a tenant ID corresponding to the first tenant requests that approval process, that user's request goes directly to the default process or process set 228A.

Although the foregoing example includes a default process or process set 228A and an alternative process set 228A', a Set_Overload_Tenant operation also may be performed between different instances of the same process set 228. Moreover, a Set_Overload_Tenant operation may be performed on different instances of the same process set 228 in both the active pool 300 and the passive pool 302. For example, one instance of a process set 228 may be provided in the active pool 300 and a redundant instance of that same process set 228 may be provided in the passive pool 302. The instance of that process or process set 228 in the passive pool may perform the Set_Overload_Tenant operation to overload the instance of that process or process set 228 in the active pool 300 such that, when a user with a tenant ID that matches the tenant ID specified in the Set_Overload_Tenant operation requests the subject process or process set 228, that user's request is directed to the instance of the process or process set 228 in the passive pool 302, which then is automatically moved to the active pool 300 so that it may be invoked. A similar process may be performed when both instances of the same process or process set 228 are provided in the active pool 300, except that both the processes or process sets 228 may be invoked without changing their statuses to active because both already are in the active pool 300.

The Set/Get_QoS operation referenced in Table 3 enables authorized users (e.g., the solution administrator or a service administrator at the cloud IT service provider) to specify one or more QoS levels or constraints for a particular CITS Container 202. A single QoS level may be specified for a particular CITS Container 202 (e.g., Priority 5) so that all of the users that access the services supported by that CITS Container 202 are subject to the same performance constraints (e.g., throughput, packet loss, latency, jitter, etc.). Or a plurality of QoS Levels (e.g., bronze, silver, gold, etc.) may be specified for a particular CITS Container 202 so that different users may be subject to different performance constraints based on different criteria, such as user ID, group ID, tenant ID, or the targeted resource (e.g., a downloaded payload 208 versus an external resource 304). In the former instance, the CMC service 212 determines if a QoS level constraint is satisfied for a user before a user is able to access the services supported by the CITS Container 202. And in the latter instance, the CMC service 212 allows the user to access the services supported by the CITS Container 202, but then governs the user's session routing and resource requests based on one or more of the foregoing criteria. Those accesses may be controlled via access portal 210.

The Set_QoS_Route operation referenced in Table 3 enables authorized users to specify the route selected for each QoS level such that user requests are redirected at run time via that specified route. The Set_QoS_Route operation may be a separate process or process set 228 from those for which it directs user requests. The Set_QoS_Route operation also may be an element of a process or process set 228 for which it directs user requests. Accordingly, via the Set/Get_QoS operation and the Set_QoS_Route operation, the run time behavior of the services supported by a particular CITS Container 202 may be shaped by run time data and the one or more QoS levels specified for that CITS Container 202.

The Get/Set_Transactional_Cost operation referenced in Table 3 enables authorized users to assign a cost model to a particular CITS Container 202, to each consumable process or process set 228 within that CITS Container 202, to each consumable element of those processes or process sets 228, and/or to each payload 208 or other resource targeted by those processes or process sets 228. Those cost models are maintained by the accounting capability of the CITS Consile 200 and may either be transactional-based costing models (e.g., charged per transaction), subscription-based costing models (e.g., charged flat fee), or a combination thereof (e.g., some services charged per transaction and others covered under a flat fee). The assignment of cost models to CITS Containers 202 and/or the elements within a CITS Container 202 enable transactional tracking and cost reporting calculations to be performed at run time in a utility model for each cloud IT service or service offering that is managed via the CMC service 212. And the resulting usage information may be logged in the a central registry database 114 of the solution provider system 102 utilizing the log management capability of the CITS Console 200.

Also in Table 3, the Get/Set_Completion_Status operation enables the reporting database capability of the CITS Console 200 or an external application to set or determine the state, or completion status, of a particular process or process set 228, task, or activity associated with or initiated by a user or by another process or process set 228 within the context of a particular CITS Container 202. The status of completion may be maintained as a percent of task completion and may be set/determined from outside the context of the CITS Container 202. The status of completion also may be set/determined from within the CITS Container 202, such as by an element of the process or process set 228 that is being tracked or by another process or process set 228. Moreover, each CITS Container 202 may define any number of different states for each process or process set 228, task, or activity to facilitate different types of status tracking.

The Reserve operation referenced in Table 5 invokes workflows in a CITS Container 202 to create a reservation for a resource or resources upon which a service or service offering of that CITS Container 202 depends. That reservation may be made to reserve the resource or resources from a specified start date to a specified end date. There also may be no end date. Accordingly, the End_Reservation operation referenced in Table 5 may invoke workflows that end the reservation when the resources are no longer needed, which may be before an end date if one has been specified. Similarly, the Extend_Reservation operation referenced in Table 4 may invoke workflows that specify an new end date that extends beyond a previously specified end date.

The Change_Reservation operation referenced in Table 5 may comprise resource management operations that are configured change the reservation parameters for a resource or resources (e.g., CPUs, hard disk capacity, etc.). And the Manage_Reservation operation referenced in Table 5 may invoke workflows that manage the state of the reservation for a resource or resources (e.g., stop, start, resume, activate, deactivate, etc.) as required to provide a service or service offering that is supported by a CITS Container 202.

Each of those Standard Operations also may be subdivided into mandatory and optional operations. Mandatory operations must be implemented for a CITS Container 202 to comply with the container standard, while optional operations may be optionally implemented or not implemented without preventing the CITS Container 202 from complying with the container standard when they are not implemented. Nevertheless, the presence of certain optional operations in a CITS Container 202 still may be required to comply with the container standard.

By contrast to mandatory and optional Standard Operations, Custom Operations are new operations that may be defined by an authorized user (e.g., the solution administrator or a service administrator at the cloud IT service provider) utilizing the Container Editor Tool. Such custom operations may be specific to a particular cloud IT service or service offering being provided with a CITS Container 202. For example, a custom operation may be to fetch a report from an underlying product database associated with a cloud IT service and to email that report to the authorized user, or some other user, every time that operation is invoked. When such a custom operation is defined, the Container Editor Tool adds an entry to the CITS specification 224 (e.g., Get_Report) that contains the information for invoking the orchestrated workflow associated with that custom operation. As a result, the custom operation will appear among the operations supported by the CITS Container 202 (e.g., List_Operations).

Each of the foregoing operations is maintained as part of the object schema definition in the CITS specification 224 of a CITS Container 202. Those operations are separate from the processes or process sets 228 that may be implemented in the CITS Container 202 so that they are not directly inline with, or tied to, the cloud IT services or service offerings supported by that CITS Container 202. Because the cloud IT services delivered via the CITS Containers 202 involve the automation of processes or process sets 228 that typically depend on one or more external product, service, appliance, application, and/or device for successful configuration and implementation, payloads 208 and/or external resources 304 are specified within the CITS specification 224 to ensure that those dependencies are satisfied when a CITS Container 202 is downloaded from the solution provider system 102.

The resources (e.g., products, services, appliances, applications, devices, etc.) upon which a CITS Container 202 may depend may reside in physical or virtual environments. Accordingly, payloads 208 may comprise virtual appliances 208A that represent a fully configured functional module or application (e.g., an n-tier application comprising multiple virtual appliances) upon which a CITS Container 202 depends to deliver its services. Such virtual appliances 208A may operate as management modules that provide value-added services for the management applications, business applications, or services being delivered within the cloud IT service delivery solution. Further, payloads 208 also may comprise such management or business applications 208B, virtual or physical appliances 208C hosting such applications, and/or automation scripts 208D that may be invoked to reconfigure content for use in the context of a particular CITS Container 202.

When the resource upon which a CITS Container 202 may depend reside on external resources 304, those external resources 304 may be exposed as physical resources via the translation logic provided at the console resource connectors 218 of the CITS Console 200 in combination with the container resource connectors 226 of the CITS Container 202, as depicted by the solid lines between the container resource connectors 226 and the external resources 304 in FIG. 3. They also may be exposed via application program interfaces (APIs) 208E in the payload pool/grid deployment 204, as depicted by the dashed lines between the API 208E and the external resources 304 in FIG. 3. Such external resources 304 may comprise, for example, external cloud IT resources 304A (e.g., IT management as cloud IT services that are delivered from IT management applications, such as monitoring services, security services, data backup services, $EC^2$ services, simple storage services ($S^3$), etc.), an external physical or virtual appliance 304B, and/or an external physical or virtual machine 304C.

A CITS Container 202 also may depend on services exposed by another CITS Container 202'. If not already plugged into the CITS Console 200, that other CITS Container 202 may need to be downloaded from the solution provider system 102 and implemented. Or if that other CITS Container 202' already has been downloaded to the local container database 120 of a service provider system 104, it may be implemented without being downloaded again. In either instance, for each product, service, appliance, application, and/or device upon which a CITS Container 202 depends to support its cloud IT services or service offerings, the CITS specification 224 not only specifies which payloads 208, external resources 304, and/or other CITS Containers 202' are required to successfully configure and implement that CITS Container 202, it also specifies the automation scripts, configuration scripts, and/or orchestration workflows required to download, configure, and/or connect, or pair, that CITS Container 202 with any payloads 208, external resources 304, or other CITS Containers 202' upon which that CITS Container 202 may depend.

Returning to Table 1, the Active GUIDs identify all of the processes or process sets 228 currently in the active pool 300 of the CITS Container 202 by their process GUIDs, and the Passive GUIDs identify all of the processes or process sets 228 currently in the passive pool 302 of the CITS Container 202 by their process GUIDs. If all of the processes or processes sets 228 in a particular CITS Container 202 have been approved for operation with the CITS Console 200, the container GUID for that CITS Container 202 will be registered. Accordingly, one may determine whether all of the processes or process sets 228 in the active pool 300 or passive pool 302 of a CITS Container 202 have been approved for operation with the CITS Console 200 based on whether or not the container GUID for the corresponding CITS Container 202 has been registered. Nevertheless, unapproved processes or process sets 228 also may be present in the active pool 300 or passive pool 302 of a CITS Container 202.

The processes or process sets 228 that are tracked with those process GUIDs are separated into an active pool 300 and a passive pool 302 so that new processes or process sets 228 and/or content may be uploaded to a CITS Container 202 in a live environment without effecting the active processes or process sets 228 and/or content. The active pool 300 comprises the processes or process sets 228 that are in an "active" state, such that they are available for external consumption by the consumers of the cloud IT service being delivered with that CITS Container 202. And the passive pool 302 comprises the processes or process sets 228 that are in an "inactive" state, such that they are not available for consumption but are available to be added to the active pool 300 or switched with processes or process sets in the active pool 300 by changing their state from "inactive" to "active." Because they are not in an "active" state, the processes or process sets 228 in the passive pool 302 may be operated on outside the context of a live deployment, while the CITS Container 202 is in the live environment, which allows for modifications, testing, expansion, and updates to processes or process sets 228 to be performed while maintaining the integrity of the CITS Container 202 in the live environment.

Each process or process set 228 in the active pool 300 may have any number of corresponding redundant, alternative, or additional processes or process sets 228 that may not be used in a particular deployment context. Those redundant, alternative, or additional processes or process sets 228 are provided in the passive pool 302. As depicted in FIG. 3, for example, there are three (3) default processes or process sets 228A-228C in the active pool 300, and one (1) alternative process or process set 228A' and one (1) additional process or process set 228D in the passive pool 302. Although the three (3) default processes or process sets 228A-228C in the active pool 300 represent the cloud IT service or service offering currently being supported by the CITS Container 202, one or both of the processes or process sets 228A' and 228D in the passive pool 302 may be switched with one or more of the processes or process sets 228A-228C in the active pool 300. In the alternative, one or both of the processes or process sets 228A' and 228D in the passive pool 302 may be added to the active pool 300 without removing any of the default processes or process sets 228A-228C from the active pool 300.

By way of more specific example, the default first process or process set 228A may support a service that requires one level of approval from a manager, and the alternative first process or process set 228A' may support the same service but require two levels of approval from a manager. And a first cloud IT service provider may need to provide its tenants with a service that requires one level of approval, while a second cloud IT service provider may need to provide its tenants with a service that requires two levels of approval. Accordingly, both the default first process or process set 228A and the alternative first process or process set 228A' are packaged in the CITS Container 202 so that different cloud IT service providers may implement different levels of service with the same CITS Container 202. Moreover, the additional process or process set 228D is packaged in the CITS Container 202 so that cloud IT service providers also may add to the existing services provided to their tenants, rather than or in addition to providing an alternative form of an existing service.

During onsite deployment of the CITS Container 202, the CITS Container 202 is implemented with the default processes or process sets 228A-228C in the active pool 300. And if a cloud IT service provider's tenants require two levels of approval, the default first process or process set 228A may be switched out for the alternative first process or process set 228A', such that the default first process or process set 228A is moved to the passive pool 302 (i.e., the status of the default first process or process set 228A is changed to "inactive") and the alternative first process or process set 228A' is moved to the active pool 300 (i.e., the status of the alternative first process or process set 228K is changed to "active"). Similarly, the additional process or process set 228D may be switched or added to the active pool 300 (i.e., the status of the additional process or process set 228D may be changed to "active") to provide an additional, different service to the cloud IT service provider's tenants. Such switching and/or adding of processes or process sets 228 may be accomplished in the field without modifying the content of the CITS Container 202.

Providing an active pool 300 and a passive pool 302 in each CITS Container 202 not only allows flexibility in the onsite configuration of the CITS Container 202 by enabling cloud IT service providers to switch or add processes or process sets 228 as required to suit different tenants without modifying the content of the CITS Container 202, it also allows new processes or process sets 228 to be uploaded to the CITS Container 202 to expand the services provided by the cloud IT service providers while the CITS Container 202 is being utilized in a live environment. For example, an authorized user (e.g., the solution administrator or a service administrator at the cloud IT service provider) may invoke the Add/Remove_Object command to load a new process or process set 228 to the passive pool 302 and then invoke the Activate/Deactivate command to activate the process or process set 228 by changing its state to "active," such that it is moved to the active pool 300. Such processes or process sets 228 automatically inherit the entitlements of the CITS Container 202 in which they are activated.

In addition to new and/or alternative processes or process sets 228, the passive pool 302 also may comprise one or more redundant processes or process sets 228 that provide substantially the same functionality as one or more corresponding processes or process sets 228 in the active pool 300. Accordingly, those redundant processes or process sets 228 may be modified, tested, expanded, and/or updated in a live environment while their corresponding processes or process sets 228 remain functioning in the active pool 300. Thus, a redundant process or process set 228 may be modified, tested, expanded, and/or updated as required in the passive pool 302 and then switched with its corresponding process or process set 228 in the active pool 300 without requiring that the services supported by that process or process set 228 be taken off line for any more time than is required to make that switch. Switching, adding, modifying, testing, expanding, and updating processes or process sets 108 in that manner may be performed with the Container Editor Tool of the CMC service 212.

The CMC service 212 not only provides functionality for authorized users to switch, add, modify, test, expand, and update the processes or process sets 108 within a particular CITS Container 202, it also provides functionality for authorized users and/or service consumers to switch, add, modify, test, expand, and update the CITS Containers 202 that are downloaded to the local container database 120 of a service provider system 104. Modifications to a CITS Container 202 may be performed via the Container Editor Tool that is provided as part of the CMC service 212. And just as processes or process sets 108 may be in an "active" or "inactive" state within a particular CITS Container 202 (i.e., in the active pool 300 or the passive pool 302), CITS Containers 200 may be in an "active" or "inactive" state when plugged into the CITS Console 200. Although a CITS Cartridge 200 that has been downloaded to the local container database 120 of a service provider system 104 also is in an "inactive" state, it is not considered to be "plugged in" to the CITS Console 200 unless it has at least been instantiated and registered in the CMC Service 212 (e.g., FIG. 4, Step 406).

Updates to and synchronizations of a CITS Container 202 may be performed by the CMC Service 212 of the CITS Console 200 regardless of whether that CITS Container 202 is plugged into the CITS Console 200. Further, changes to and the current state of a CITS Container 202 may be logged by the log management capability of the CITS Console 200 regardless of whether that CITS Container 202 is plugged into the CITS Console 200. But by plugging a CITS Cartridge 202 into the CITS Console 200, authorized users may utilize the CMC Service to modify certain core functionality of a CITS Container 202 when it is in an "inactive" state. Authorized users may test those modifications, or make and test modifications to other functionality (e.g., processes and process sets 228), when the CITS Container 202 is plugged in and in an "active" state. Also when the CITS Container 202 is in an "active" state, service consumers may select certain cloud IT services or service offerings from the service request catalog 216 for run-time execution.

An authorized user may modify the core functionality of a CITS Container 202 in the "passive" state after it is instantiated or registered, but before its corresponding cloud IT services or service offerings are published to the service request catalog 216. Such modifications might include, for example, adding or creating one or more Custom Operations in the CITS specification 224, adding or creating one or more custom container resource connectors 226 for a particular physical resource, and/or adding or creating a custom set of user-facing interfaces 230 for a particular service or service provider. After such modifications have been completed, the corresponding CITS Container 202 may be placed in the "active" state and tested in an isolated test environment. Such a test environment may comprise the actual payloads 208 and/or external resources 304 upon which that particular CITS Container 202 depends, in which case those payloads 208 and/or external resources 304 may need to be downloaded and/or connected to; it may comprise virtualizations of those payloads 208 and/or external resources 304; or it may comprise some combination thereof. Accordingly, an isolated test environment may be created as required to ensure that the subject CITS Container 202 may be tested without interrupting or interfering with the operation of any of the other CITS Containers 202 that also may be plugged into the CITS Console 200.

Upon the successful completion of such testing, the corresponding cloud IT services or service offerings may published to the service request catalog 216 for consumption by service consumers. In the alternative, the modified CITS Container 202 may be returned to the inactive state for further modification or unplugged from the CITS Console 200 for subsequent retrieval from the local container database 120. Further, the modified CITS Container 202 may be uploaded to the solution provider system 102 for testing and support approval. If certified for operation within the CITS Console 200, the modified CITS Container 202 is added to the central container database 110 and identified in the global registry with a unique container GUID.

As discussed above, authorized users may modify and test the processes or process sets 228 within the CITS Container 202 not only while the CITS Container 202 is in an "active" state, but also while it is in a live environment. That can be accomplished, for example, by providing duplicate instances of the same process or process set 228—one instance in the active pool 300 and one instance in the active pool 302. The first instance may be enabled for run-time execution in the active pool 300 while the other instance is being modified and tested in the passive pool 302. The two instances then may be switched with each other upon completion of the modifications and testing. A similar result may be achieved when modifying the core functionality of a CITS Container 202 by downloading duplicate instances of the same CITS Container 202 to a CITS Console 200 and modifying one in the "inactive" state' while the other is in the "active" state and being operated in a live environment.

Figure 4:
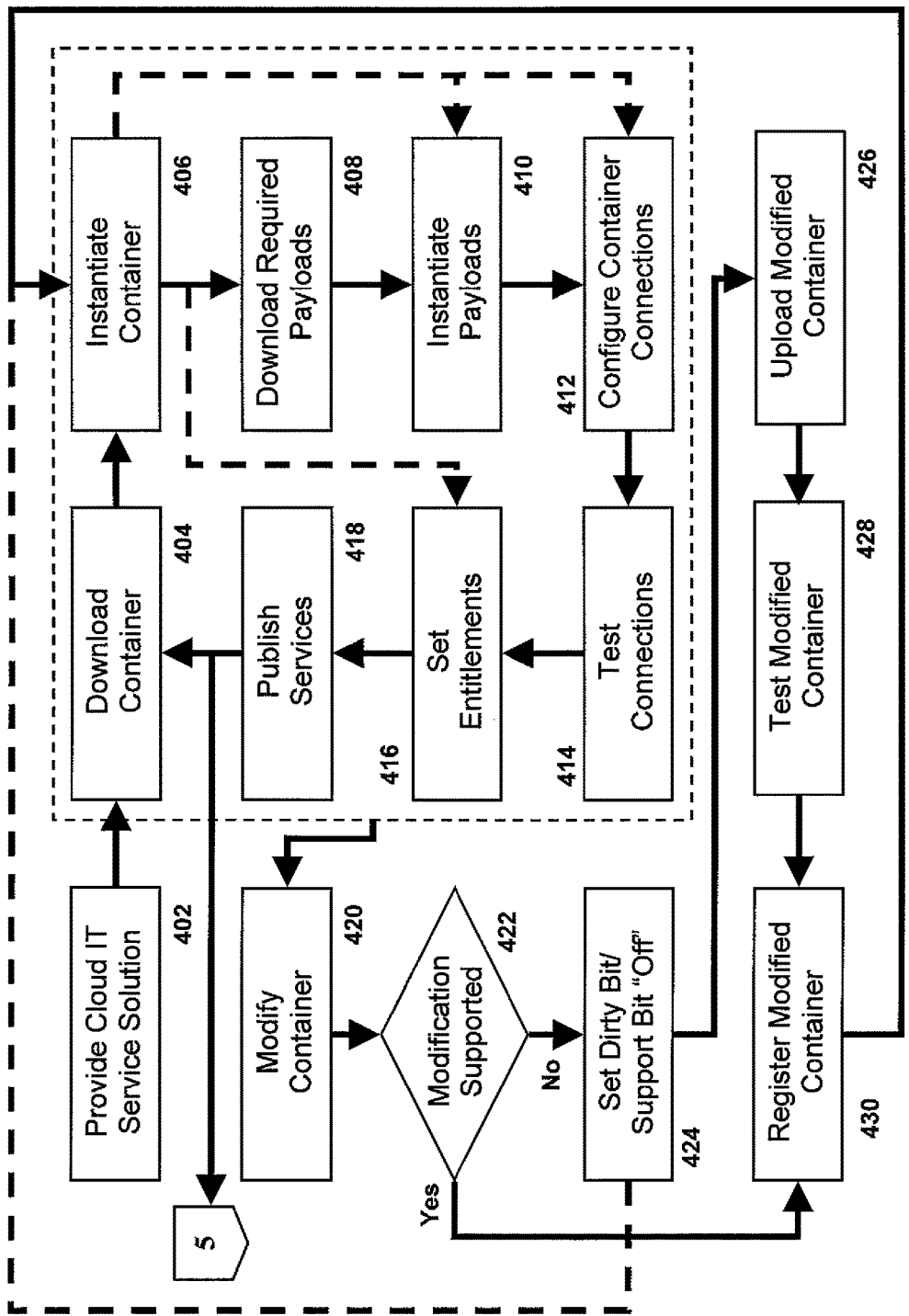
FIG. 4 is a flow diagram illustrating an example of a container implementation and modification process according to a non-limiting embodiment of the present disclosure.

Turning to FIG. 4, an example of a container implementation and modification process 400 is illustrated. At step 402, the solution administrator that offers IT management software and solutions via the solution provider system 102 provides a cloud IT service provider with a cloud IT service solution at the service provider system 104 maintained by that cloud IT service provider. That cloud IT service solution comprises the CITS Console 200, which comprises the access portal 210, the CMC service 212, the orchestration engine 214, the service request catalog 216, the console resource connectors 218, the intermediary interconnect or service bus 220, and the aggregated set of common capabilities 222. The CITS Console 200 and its components 210-222 may be provided locally on the services servers 118 of the service provider system 104, they may be provided remotely on the solution servers 108 of the solution provider system 102, or they may be divided across both systems 102 and 104.

The CMC service 212 comprises, among other elements, the Container Editor Tool and a pool/grid controller that instantiates and configures the downloaded payloads 208 in the payload pool/grid deployment 212. The CMC service 212 provides the cloud IT service provider with a catalog of the CITS Containers 202 available for download from the solution provider system 102. And the orchestration engine 214 supports the autonomic instantiation and implementation of downloaded CITS Containers 202, as well as the download of the payloads 208 upon which the downloaded CITS Containers 202 depend.

The cloud IT service solution also comprises the aggregated set of common capabilities 222; the payload pool/grid deployment 204; local container and payload libraries; and a local registry of supported CITS Containers 202, processes and process sets 228, and container affiliations. The aggregated set of common capabilities 222 and the payload pool/grid deployment 204 may be provided on the services servers 118 of the service provider system 104; the local container library may be provided on the local container database 120; the local payload library may be provided on the local payload database 120; and the local registry of supported CITS Containers 202, processes and process sets 228, and container affiliations may be provided on the local registry database 122. The payload pool/grid deployment 204; local container and payload libraries; and a local registry of supported CITS Containers 202, processes and process sets 228, and container affiliations also may be provided remotely on the solution servers 108 of the solution provider system 102, or they may be divided across both systems 102 and 104. Those elements of the cloud IT service solution, together with the CITS Console 200, provide the cloud IT service provider with tools to implement the cloud IT service solution at the service provider system 102.

At step 404, either the solution administrator or the cloud IT service provider downloads the CITS Containers 202 that support the services that the cloud IT service provider will provide its customers with the cloud IT service solution provided at step 402. Those CITS Containers 202 may be selected from the catalog and are downloaded to the local container database 120 of the service provider system 104 from the central container database 110 of the solution provider system 102. Generally, the solution administrator will download those CITS Containers 202 to the service provider system as part of the cloud IT service solution initially delivered to the cloud IT service provider, and the cloud IT service provider will download any other CITS Containers 202 that may subsequently be required to support any new or different services that the cloud IT service provider would like to provide its customers on an as-needed basis. In other words, after the solution administrator delivers the cloud IT service solution to the cloud IT service provider at steps 402 and 404, the cloud IT service provider may utilize the CMC service 212 to repeat step 404 in a self-service manner as required to meet its own changing needs and/or those of its customers.

When a CITS Container 202 is downloaded, it is added to the local container library on the local container database 120. Further, if it is designated as a supported CITS Container 202, it is registered in the local registry on the local registry database 124 together with the process GUIDs for any processes or process sets 228 provided in that CITS Container 202. Downloading a CITS Container 202 at step 404 initiates an autonomic process, which is performed at steps 406-416.

At step 406, the orchestration engine 214 instantiates the downloaded CITS Container 202 in the context of the particular cloud IT service solution by invoking operations provided in the CITS specification 224 (e.g., Instantiate, Activate, etc.). At step 408, the orchestration engine 214 reads and decomposes automation scripts from the CITS specification 224 and invokes those scripts or workflows to automatically download any payload(s) 208 that may be required to implement the services or service offerings that are supported by that CITS Container 202. As described above, the CMC service 212 may automatically connect to the solution provider system 102 and download the payload(s) 208 to the local payload database 122 of the service provider system 104 from the central payload database 112 of the solution provider system 102. And at step 410, the pool/grid controller instantiates the downloaded payload(s) 208 by deploying an instance of the payload(s) 208 in the payload pool/grid deployment 204.

When a payload 208 is downloaded, it is added to the local payload library on the local payload database 122. That payload 208 then may be utilized to support any CITS Container 202 that may subsequently downloaded and that also depends on that payload 208. Accordingly, a payload 208 may be deployed directly from the local payload database 122 when it already has been downloaded, rather than being downloaded from the central payload database 112 before it is deployed for a particular CITS Container 202. Thus, step 408 may be skipped if all of the payloads 208 required by a downloaded CITS Container 202 already have been downloaded, as depicted by the dashed-line arrow extending from step 406 to step 410 in FIG. 4. Further, a downloaded CITS Container 202 may depend only upon external resources 304, such that no payloads 208 need to be downloaded at step 408 or instantiated at step 410. Thus, both step 408 and step 410 may be skipped if all of no payloads 208 are required by a downloaded CITS Container 202, as depicted by the dashed-line arrow extending from step 406 to step 412 in FIG. 4.

At step 412, the orchestration engine 214 reads and decomposes configuration scripts from the CITS specification 224 and invokes those scripts to automatically configure, or pair, the CITS Container 202 with the instantiated payload(s) 208, or with any external resource 304 or other CITS Containers 202 upon which that CITS Container 202 may depend. The CITS Container 202 is paired with those payloads 208 and/or external resources 304 via its corresponding container resource connectors 226. And if that CITS Container 202 depends upon one or more payloads 208 or other logical resources, the orchestration engine 214 consumes or executes orchestration workflows to perform operations on the appropriate container resource connectors 226 provided within the CITS Container 202 so that those container resource connectors 226 may be translated to their corresponding physical implementations at the service provider servers 118 of the service provider system 104, the console resource connectors 218 of the CITS Console 200, and/or the external resources 304 provided by a third-party resource provider. Accordingly, the CITS Container 202 may be configured to connect to payloads 208 and/or external resources 304 directly via its corresponding container resource connectors 226; indirectly via its corresponding container resource connectors 226 and the console resource connectors 218 of the CITS Console 200; or indirectly via its corresponding container resource connectors 226, the console resource connectors 218 of the CITS Console 200, and the service bus 220. As yet another alternative, the CITS Container 202 also may be configured to connect to payloads 208 and/or external resources 304 via standard internet protocols.

The object schema definition in the CITS specification 224 contain the download instructions and the link information for any payload(s) 208 and/or external resources 304 that may be required to implement a particular CITS Container 202, as well as any information required to determine and apply the appropriate translation between any logical resource and its physical implementation at a payload 208 or external resource 304. The specific resource abstractions required to perform such translations may be provided resource connectors, such as the console resource connectors 218 and the container resource connectors 226. The abstractions of the console resource connectors 218 may be utilized to perform translations for more than one CITS Container 202, while the abstractions of the container resource connectors 226 may be specific to a particular CITS Container 202, which is why the latter are provided in the CITS Container 202, rather than in the CITS Console 200.

At step 414, the orchestration engine 214 runs a test to confirm that the connections between the CITS Containers 202 and the payloads 208 and/or external resources 304 configured at step 412 are properly functioning. More specifically, the orchestration engine 214 runs a test to determine whether the processes or process sets 228 in each CITS Container 202 are configured to connect to the correct payloads 208 and/or external resources 304, and that those connections are configured as required to provide the services that are supported by that CITS Container 202. Such a test may involve establishing temporary connections with and issuing test commands to the subject payloads 208 and/or external resources 304. The subject payloads 208 and/or external resources 304 then will return a "completed" or "failed" status and the reporting database capability of the CITS Console 200 will monitor the performance of the connections. If the returned status is "completed" and the connections perform as required, the connections will pass the test performed at step 414 and the container implementation process 400 will proceed to step 416.

Depending on the cloud IT service or service offering and the contents of a particular CITS Container 202, that CITS Container 202 may not depend upon any payloads 208 and/or any external resources 304 to support its cloud IT services or service offerings. In that instance, the CITS Container 202 may comprise all of the operations required to implement its cloud IT services or service offerings when combined with the aggregated set of common capabilities 222 of the CITS Console 200. Thus, steps 408-414 may be skipped if the CITS Container 202 does not depend upon any payloads 208 or any external resources 304 to support its cloud IT services or service offerings, as depicted by the dashed-line arrow extending from step 406 to step 416 in FIG. 4.

At step 416, the orchestration engine 214 automatically sets the entitlements for the CITS Container 202 so as to allow the cloud IT service provider to fully configure the cloud IT services or service offerings that are supported by that CITS Container 202. And at step 418, those cloud IT services or service offerings are published to the service request catalog 216 where they can be consumed by service consumers in a self-service manner. Step 418 completes the autonomic process initiated by downloading a CITS Container 202 at step 404, which completes the implementation of a CITS Container 202 in a cloud IT service solution. Accordingly, steps 404-418 may be repeated each time a CITS Container 202 is downloaded until all of the CITS Containers 202 required to support a particular cloud IT service solution have been downloaded, as depicted by the dashed-line box surrounding those steps in FIG. 4.

As FIG. 4 also illustrates, an authorized user (e.g., the solution administrator or a service administrator at the cloud IT service provider) may utilize the Container Editor Tool of the CMC service 212 to modify a downloaded CITS Container 202 in a live environment, after it has been implemented. For example, a downloaded CITS Container 202 may initially comprise one or more processes or process sets 228 in the active pool 300 that define the complete capabilities of the cloud IT service or service offering supported by that CITS Container 202. And the CITS Container 202 may comprise zero or more processes or process sets 228 in the passive pool 302 that define additional or redundant cloud IT services or service offering that may optionally be delivered by that CITS Container 202. Because that CITS Container 202 was downloaded from the solution provider system 102 at step 404, that CITS Container 202 and each of the processes or process sets 228 in each of its pools 300 and 302 will be registered as being supported by the CMC service 212 in the global container registry that is maintained in the central registry database 102. Accordingly, the Dirty Bit/Support Bit in the CITS specification 224 is set to a default value of "supported," or "on," which represents the starting state of the CITS Container 202 when it is downloaded.

At step 420, an authorized user (e.g., the solution administrator or a service administrator at the cloud IT service provider) may modify the CITS Container 202 by switching, adding, and/or removing one or more processes or process sets 228 between the active pool 300 and the passive pool 302 by changing the state of those processes or process sets 228, thereby changing the capabilities of the cloud IT service or integration supported by the CITS Container 202. In FIG. 3, for example, the authorized user may switch out the default first process or process set 228A for the alternative first process or process set 228A', such that the default first process or process set 228A is moved to the passive pool 302 (i.e., the state of the default first process or process set 228A is changed to "inactive") and the alternative first process or process set 228A' is moved to the active pool 300 (i.e., the state of the alternate first process or process set 228A' is changed to "active"). Or the authorized user may add the additional process or process set 228D into the active pool 300 (i.e., the state of the additional process or process set 228D is changed to "active") to provide an additional, different service. Such modifications may be performed in a live environment, without compromising the integrity of the CITS Container 202.

Also at step 420, an authorized user may create and/or modify one or more processes or process sets 228, rather than switching processes or process sets 228 between pools 300 and 302 and/or adding processes or process sets 228 from the passive pool 302 to the active pool 300. To maintain the integrity of the CITS Container 202 in the live environment, however, processes or process sets 228 may not be modified in the active pool 300. Thus, to modify a process or process set 228 that currently is in the active pool 300, the authorized user must first move that process or process set 228 to the passive pool 302 by changing the state of that process or process set 228 to "inactive." In the alternative, the authorized user may upload, or copy, a redundant instance of the same process or process set 228 to the passive pool 302 so that the corresponding process or process set 228 need not be removed from the active pool 300, thereby preventing the disruption of the service supported by that process or process set 228. Accordingly, such modifications also may be performed in a live environment, without compromising the integrity of the CITS Container 202.

The authorized user may create and/or modify one or more processes or process sets 228 with the Container Editor Tool, which supports operations for copying, modifying, or creating new processes or process sets 228 in the passive pool 302. Accordingly, the authorized user may modify an existing, registered process or process set 228 or create a new process or process set 228 from scratch when a CITS Container 202 that suits the cloud IT service provider's needs is not available for download from the solution provider system 102. In response to the creation and/or modification of a process or process set 228, the Container Editor Tool writes a new, unregistered container GUID to the CITS specification 224 because the subject CITS Container 202 comprises a new and/or modified process or process set 228 that has not yet been determined to be supported.

In response to any type of modification (e.g., switching, adding, removing, modifying, or creating processes or process sets 228), the Container Editor Tool also generates a log of those modifications and writes it to the CITS specification 224, together with the current state of the CITS Container 202. That modification log may be queried by the CMC service 212 to identify specific modifications to a CITS Container 202 and when they were made. Such a log may be utilized by the solution administrator when determining whether a modification is approved for operation in the CITS Console 200.

At step 422, the CMC service 212 determines if the modification performed at step 420 is supported. If the processes or process sets 228 already provided in a registered CITS Container 202 were switched, added, and/or removed to/from to the active pool 300 at step 420, the modification is determined to be supported at step 422 (i.e., Step 422=Yes). But if processes or process sets 228 were created and/or modified at step 420, those new processes or process sets 228 will be determined to be unsupported at step 422 (i.e., Step 422=No). Thus, the Container Editor Tool toggles the Dirty Bit/Support Bit in the CITS specification 224 to "unsupported," or "off," at step 424 when a process or process set 228 is modified and/or created at step 420, while switching, adding, and/or removing processes or process sets 228 already provided in a registered CITS Container 202 to/from the active pool 308 at step 420 does not effect the Dirty Bit/Support Bit, which remains set to the default value of "supported," or "on," at step 424 after such a modification.

Toggling the Dirty Bit/Support Bit to "unsupported," or "off," at step 424 represents that the subject process or process set 228 has not been approved for operation with the CITS Console 200. Nevertheless, the authorized user may add that modified process or process set 228 to the active pool 420 at step 420. The addition of such an unsupported process or process set 228 to the active pool 300, however, may compromise the integrity of the CITS Container 202. Accordingly, the authorized user also may leave the modified process or process set 228 in the passive pool 302 and upload an instance of the modified CITS Container 202 to the solution provider system 102 at step 426 for testing, certification, and support approval.

At step 428, new or modified process or process set 228 is moved to the active pool 300 by changing its state to "active" in the uploaded instance of the CITS Container 202, and it is tested for problems. After any problems are identified and resolved, the new or modified process or process set 228 may be certified for use with the CITS Container 202 and approved for operation with the CITS Console 200. The corresponding CITS Container 202 then is registered in the global registry at step 430 to indicate that its processes or process sets 228 have been certified and approved. Such registered CITS Containers 202 are identified in the global registry with unique container GUIDs. Then, after the CITS Containers 202 with the modified process or process set 228 is registered at step 430, the authorized user may switch and/or add that process or process set 228 to the active pool 300 of the live instance of the corresponding CITS Container 202 without compromising the integrity of that CITS Container 202, and without interrupting the services that are supported by the live instance of that CITS Container 202.

Even though switching and/or adding processes or process sets 228 to the active pool 300 in registered CITS Containers 202 does not effect the Dirty Bit/Support Bit in the CITS specification 224, such a modification changes the content of the CITS Container 202. Accordingly, the modified CITS Container 202 also may be registered with the solution provider system 102 at step 430 even when a modification is determined to be supported at step 422. Such modified CITS Containers 202 may be registered both in the local registry maintained in the local registry database 124 and the global registry maintained in the central registry database 114 so that the solution provider system 102 may track such modifications, which allows the solution administrator to update their default processes or process sets 228 in response to the modifications being made in the field. The registration of CITS Containers 202 with new or modified processes or process sets 228 at step 430 supports similar tracking.

Being able to switch, add, remove, modify, and/or create processes or process sets 228 enables cloud IT service providers to flexibly change the capabilities of a CITS Container 202 in a self-service manner. And being able to perform such modifications on processes or process sets 228 in a passive pool 302 enables cloud IT perform those modifications in a live environment without compromising the integrity of the CITS Container 202 or the service supported by that CITS Container 202. Moreover, registering those modifications with the solution provider system 102 supports the development and proliferation of enhancements of to cloud IT services provided by such CITS Containers 202. In addition, by encompassing multiple switchable, processes or process sets 228 in a single CITS Container 202, a cloud IT service provider may modify a cloud IT service being delivered by a CITS Container 202 on the fly without having to re-test all the services that may be effected by the change, thus saving time, avoiding costly delays, costs and custom implementations.

To provide additional flexibility, different container operations may be created and/or modified for a particular CITS Container 202 in a similar manner to that described above with respect to modifying and/or creating processes or process sets 228 (e.g., Steps 420-424). Further, those new and/or modified operations may be uploaded, tested, and registered with the solution provider system 102 in a similar to that describe above with respect to processes or process sets 228 (e.g., Steps 426-430). Registering new and/or modified container operations in that manner further prevents compromising the integrity of a CITS Container 202 while, at the same time, enabling flexibility of design. And although the modifications described above were performed with the CITS Container 202 in an "active" state after the cloud IT services or service offerings of that CITS Container 202 have been published to the service request log 216 at step 418, they also may be performed at with the CITS Container 202 in an "inactive" state before the cloud IT services or service offerings of that CITS Container 202 have been published to the service request catalog 216 at step 418.

For example, rather than modifying a CITS Container 202 in a live environment, after the supported cloud IT services or service offerings have been published to the service request catalog 216 at step 418, steps 420-430 may be performed any time after the subject CITS Container 202 has been instantiated at step 406, as depicted by the arrow that generally connects step 420 to the box around steps 404-418 in FIG. 4. Performing such modifications before the supported cloud IT services or service offerings have been published to the service request catalog 216 may be advantageous, for example, when the core functionality of the subject CITS Container 202 is being modified. That way, the services or service offerings that are effected by that core functionality will not be available for consumption by service consumers while those modifications are being performed. And to prevent service interruptions, a duplicate instance of the subject CITS Container 202 may be downloaded to the CITS Console 200 so that the services or service offerings of that duplicate instance of the CITS Console 200 may be published to the service request catalog 216 and consumed by service consumers while the core functionality of the other instance of that CITS Container 202 is being modified.

Regardless of whether a CITS Container 202 is modified before or after its cloud IT services or service offerings have been published to the service request catalog at step 418, that modified CITS Container 202 must be re-instantiated at step 406 for the modification to be enabled for run-time execution, as depicted by the arrow extending from step 424 to step 406 and the arrow extending from step 430 to 406 in FIG. 4. As discussed above, such modifications result in new container GUIDs being written to the CITS specification 224. For example, modifying the core functionality of a CITS Container may result in a new container GUID being written to the CITS specification 224, and modifying a process or process set 228 may result in a new process GUID being written to the CITS specification 224. Accordingly, a CITS Container 202 must be re-instantiated at step 406 after being modified so that its CITS specification 224 may be updated in the context of the CITS delivery solution in which it is being implemented.

A modified CITS Container 202 may be re-instantiated at step 406 and enabled for run-time execution regardless of whether the subject modifications are registered via steps 426-430. For example, an authorized user may modify a CITS Container 202 at step 420 by adding a certified and approved process or process set 228 to the active pool 300 of that CITS Container 202. Because that process or process set 228 already is certified and approved for use in the CITS Console 200 and CITS Container 202, the Dirty Bit/Support Bit of that CITS Container 202 remains set to the default value of "supported," or "on," at step 424. Thus, that CITS Container 202 also may be re-instantiated at step 406 and enabled for run-time execution after step 424, as depicted by the dashed-line arrow extending from step 424 to step 406 in FIG. 4. Similarly, a CITS Container 202 that has its Dirty Bit/Support Bit toggled to "unsupported," or "off," at step 424 because it contains an unapproved modification also may be re-instantiated at step 406 and enabled for run-time execution. As described above, however, implementing such unapproved modifications may compromise the integrity of that CITS Container 202 or the CITS Console 200.

A CITS Container 202 is enabled for run-time execution by at least performing steps 416 and 418 after it is re-instantiated at step 406. For example, a CITS Container 202 may have been modified at steps 420-424 in a live environment such that all of the payloads 208 required to support the cloud IT services or service offerings of that CITS Container 202 already have been downloaded, instantiated, configured, and tested at steps 408-414. Thus, when that CITS Container 202 is re-instantiated at step 406, it may be enable for run-time execution by setting its entitlements at step 416 and publishing its cloud IT services or service offerings to the service request catalog 216 at step 418. Steps 408-414 also may be performed, for example, if the modifications to the CITS Container 202 require different payloads 208 to be downloaded and/or different connections to be made via those steps 408-414. And after the cloud IT services or service offerings of a CITS Container 202 are published to the service request catalog at step 418, the corresponding service or service offering may be invoked by a service consumer in a self-service manner to obtain those cloud IT services or service offerings, as depicted in FIG. 4 by the arrow extending from step 418 to FIG. 5.

Figure 5:
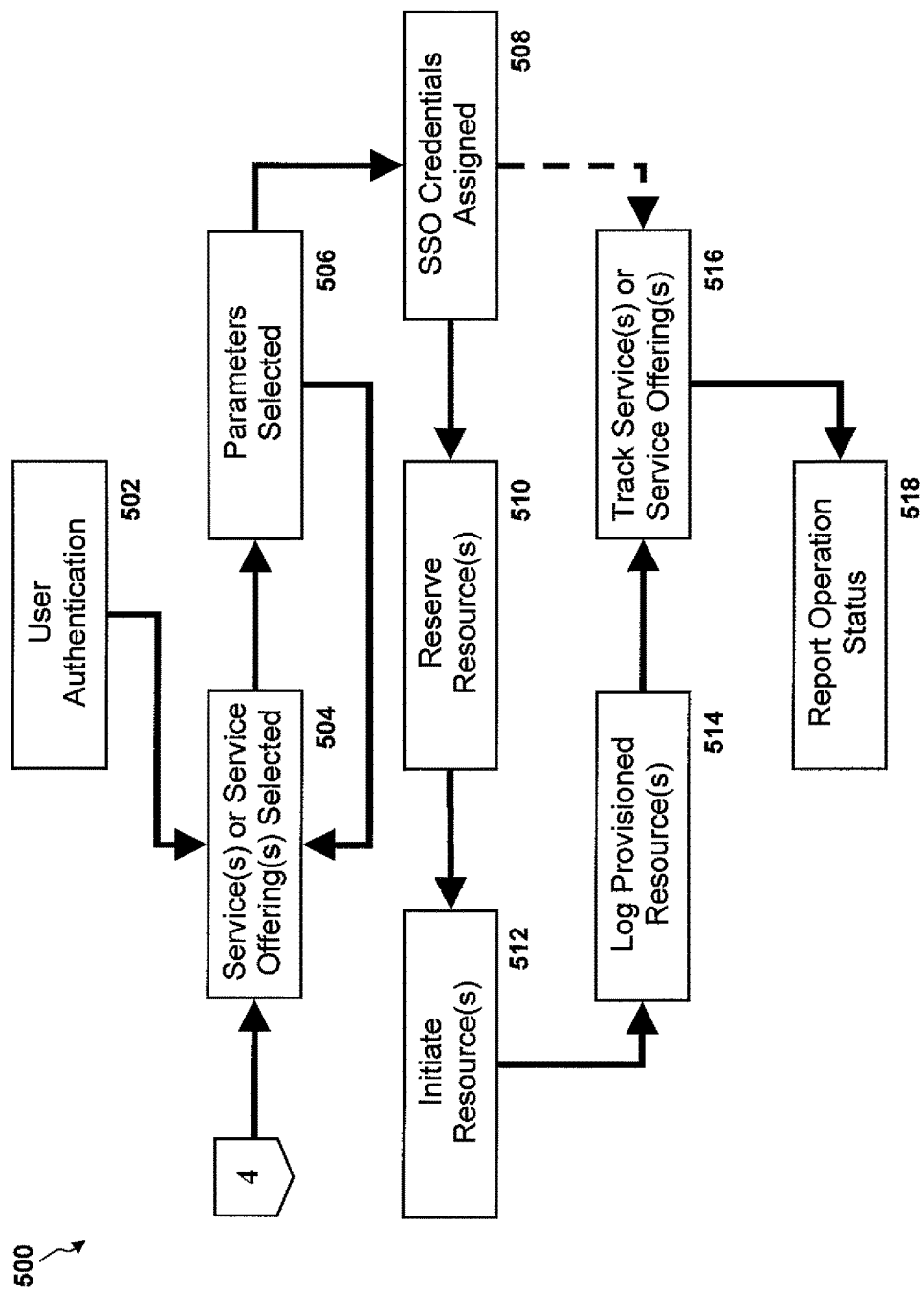
FIG. 5 is a flow diagram illustrating and example of a container execution process according to a non-limiting embodiment of the present disclosure.

Turning to FIG. 5, an example of a container execution process 500 is illustrated. At step 502, a service consumer logs onto the service provider system 104 and is authenticated via the user authentication capability of the CITS Console 200. After being authenticated, the service consumer may view the available cloud IT services or service offerings that have been published to the service request catalog 216. And at step 504, the service consumer selects the cloud IT service or service offering that it would like to consumer by invoke the corresponding user-facing interface 230 of the CITS Container 202 that supports the selected cloud IT service or service offering. The service consumer may select from any cloud IT service or service offering published to the service request catalog 216 at step 418 of the container implementation process 400, as depicted by the arrow in FIG. 5 extending from FIG. 4 to step 504.

At step 506, the service consumer specifies the operating parameters required for the selected cloud IT service or service offering. For example, the service consumer may specify predefined QoS levels or constraints (e.g., Set/Get_QoS) for the selected cloud IT service or service offering, such as throughput, packet loss, latency, jitter. Or a plurality of QoS levels (e.g., bronze, silver, gold, etc.) may be specified for the selected cloud IT service or service offering so that different users may be subject to different performance constraints based on different criteria, such as user ID, group ID, tenant ID, or the targeted resource. Those QoS service and constraints also may be applied across all of the cloud IT services or service offerings of a particular CITS Container 202, as well as across a plurality of CITS Containers 202. Also at step 506, the service consumer may specify the run-time routing for each selected QoS level (e.g., Set_QoS_Route).

Steps 504 and 506 may be repeated as many times as required to select the cloud IT services or service offerings that the service consumer would like to consume and to set the QoS levels or constraints for those cloud IT services or service offerings, as depicted by the arrow extending from step 506 back to step 504 in FIG. 5. The resulting accesses and routing may be controlled via the access portal 210. And at step 508, SSO credentials may be assigned to different users at a service provider system 104 based on the different accesses those users are to have to different cloud IT services or service offerings.

At step 510, the resource reservation capability of the CITS Console 200 is invoked to create reservations for the resources utilized by the cloud IT services and/or service offerings selected at step 504. For example, the orchestration engine 214 may invoke an orchestration workflow to operate on the logical resources of the corresponding CITS Container 202, such as logical virtual machine and logical disk to create the reservation for the physical implementations of those logical resources. The physical implementations of those logical resources may comprise, for example, a product (e.g., a VM manager) and an appliance (e.g., a disk manager), respectively.

At step 512, the resources reserved at step 510 are deployed for use by a CITS Container 202 that supports the selected cloud IT service or service offering. The CITS Container 202 is configured to communicate with each of those resources at step 412 of the container implementation process 600. For example, when the resources upon which a CITS Container 202 depends are provided by a third-party resource provider as external resources 304, those resources may have been configured at step 412 of the container implementation process 400 by physical commands sent to the third-party resource providers that maintain those external resources 304. Similar commands may be sent to resources at step 512 to initiate them for run-time execution.

At step 514, the results of the commands sent at step 510 (e.g., "completed" or "failed") are logged by the log management capability of the CITS Console 200. Also logged by log management capability of the CITS Console 200 are the specific resource allocations initiated at step 510. As discussed above, however, some CITS Containers 202 may not depend on any external resources, other than the aggregated set of capabilities 222 of the CITS Console 200, in which case steps 510-514 may be skipped, as depicted by the dashed-line arrow extending from step 508 to step 516 in FIG. 5.

At step 516, the accounting capability of the CITS Console 200 begins tracking the cloud IT services and/or service offerings being delivered to a particular service consumer and provides an accounting of those services. For example, chargeback amounts are calculated by invoking logical resource costing operations to determine the amount of services a service consumer is consuming and the correspond costs associated with that consumption. Accordingly, service consumers may only be charged for certain services as they are consumed, in a self-service manner.

At step 515, the status of whether the preceding operations were successful or failed is reported back to the service consumer together with resource information for performing further operations. If each required resource was initiated at step 512 and is being logged and tracked at steps 516, the operations are determined to be successful and the container execution process 500 is concluded.

As will be understood from the foregoing examples, the disclosed CITS Console 200 and CITS Containers 202 are configured to operate together to provide a hybrid cloud solution with one or more cloud IT services or service offerings. The resulting hybrid cloud solution is flexible and modularly expandable by the addition or removal of different CITS Containers 202 to the CITS Console 200 and/or by the addition or removal of different processes or process sets 228 to one or more CITS Cartridges 202. The CITS Containers 202 may connect to and/or operate via the aggregated set of common capabilities 222 of the CITS Consile 200 as well as carry or refer to other resources, such as payloads 208, upon which the cloud IT services or service offerings of a CITS Container 202 may depend.

The CITS Console 200 provides the foundational framework for advanced, granular management and control of the CITS Containers 202 and their corresponding processes or process sets 228, thereby enabling higher level operations to be performed on a container-by-container basis, such as listing services, setting entitlements, tracking consumer activity across a service, downloading/uploading containers, metering usage, etc. Further, the CITS Console 200 provides both service providers and service consumers with access to a large number or types of cloud IT services or service offerings that may be delivered via a reference model based on automatically instantiated CITS Containers 202 and payloads 208. Such CITS Containers 202 and payloads 208 may be developed for any type of cloud IT services and, therefore, the disclosed embodiments are not restricted to any particular service, vendor, or product.

Further, the schematic and flow diagrams in FIGS. 1-5 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As a general example, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising using one or more processors to execute computer-readable program code to perform the following:
providing a plurality of common capabilities that comprise operations that are configured to be invoked by a plurality of different processes on a plurality of different containers, the plurality of common capabilities comprising a service delivery solution when invoked by a process from among the plurality of different processes;
downloading at least one container from among the plurality of different containers, the at least one container comprising at least one process from among the plurality of different processes when downloaded; and
invoking the plurality of common capabilities with the at least one process of the at least one container,
wherein each of the plurality of different processes corresponds to a different service, and
wherein the plurality of different containers are configured to be utilized interchangeably in a plurality of different service delivery solutions as downloaded, and each of the different service delivery solutions is configured to be expanded and contracted by utilizing the plurality of common capabilities to invoke greater or fewer processes on greater or fewer containers.

2. The method of claim 1, wherein:
as downloaded, each of the plurality of different containers comprises a container specification that specifies each resource upon which a process on that container depends to provide a service; and
each container specification comprises:
first operations configured to automatically deploy the container by invoking first workflows that install that container in the context of the service delivery solution,
second operations configured to provide the service of the container by invoking second workflows that operate on each resource upon which that container depends to provide that service; and
the method further comprises executing the first operations and the second operations.

3. The method of claim 2, further comprising using the one or more processors to execute computer-readable program code to connect the container to one or more of the resources upon which a process on that container depends via an application programming interface utilizing standard internet protocols.

4. The method of claim 2, further comprising:
using the one or more processors to execute computer-readable program code to utilize resource connectors provided in the container specification to translate a logical implementation of each resource to its corresponding physical implementation, and
using the one or more processors to execute computer-readable program code to utilize the second workflows to invoke third operations on the resource connectors, the third operations being configured to enable the second workflows to operate on each resource upon which the container depends to provide a service.

5. The method of claim 4, wherein:
each of the resource connectors resides either on the computer-readable program code or on the container; and
the method further comprises using the one or more processors to execute computer-readable program code to connect each of the resource connectors to its corresponding resource via an integration bus.

6. The method of claim 2, wherein:
the container specification further comprises:
one or more service offerings for the service provided by that container,
one or more standardized service type templates for each of the one or more service offerings that are configured to generate a standardized user interface for providing the service of the container, and
fourth operations configured to at least one of initiate, configure, test, and activate the service provided by that container; and
the method further comprises:
using the one or more processors to execute computer-readable program code to publish each different service offering for each different service to a service request catalog,
using the one or more processors to execute computer-readable program code to receive input to select a service offering that is published to the service request catalog, and
using the one or more processors to execute computer-readable program code to execute the fourth operations to at least one of initiate, configure, test, and activate the service that corresponds to the service offering selected from the service request catalog.

7. The method of claim 6, wherein:
the container specification further comprises fifth operations configured to at least one of reserve, provision, and monitor each resource upon which the corresponding container depends to provide a service;
the method further comprises using the one or more processors to execute computer-readable program code to execute the fifth operations.

8. The method of claim 6, wherein:
the method further comprises using the one or more processors to execute computer-readable program code to invoke operations in the container specification of each of the one or more of the plurality of different containers as required to manage that container; and
managing a container comprises using the one or more processors to execute computer-readable program code to at least one of:
register the container;
unregister the container;
activate the container in the service delivery solution;
deactivate the container in service delivery solution;
configure the container to operate as part of the service delivery solution;

patch the container with additional content;
update the container to a newer version;
add at least one of a second, third, fourth, fifth, and a sixth operation to the container specification of that container, the sixth operation being different than the first, second, third, fourth, and fifth operations; and
modify at least one of a second, third, fourth, fifth, and the sixth operation to the container specification of that container.

9. The method of claim 1, wherein the plurality of common capabilities are invoked by two or more processes on two or more of the plurality of different containers to provide two or more different services.

10. A non-transitory computer program product stored in memory that is configured to be executed by a processor, the computer program product comprising:
computer-readable program code that, when executed by the processor, is configured to define a plurality of common capabilities that comprise operations that are configured to be invoked by a plurality of different processes on a plurality of different containers, the plurality of common capabilities comprising a service delivery solution when invoked by a process from among the plurality of different processes;
computer-readable program code that, when executed by the processor, is configured to download at least one container from among the plurality of different containers, the at least one container comprising at least one process from among the plurality of different processes when downloaded; and
computer-readable program code that, when executed by the processor, is configured to invoke the plurality of common capabilities with the at least one process of the at least one container,
wherein each of the plurality of different processes corresponds to a different service,
wherein the plurality of different containers are configured to be utilized interchangeably in a plurality of different service delivery solutions as downloaded, and each of the different service delivery solutions is configured to be expanded and contracted by utilizing the plurality of common capabilities to invoke greater or fewer processes on greater or fewer containers.

11. The computer program product of claim 10, wherein:
as downloaded, each of the plurality of different containers comprises a container specification that specifies each resource upon which a process on that container depends to provide a service; and
each container specification comprises:
first operations configured to automatically deploy the container by invoking first workflows that install that container in the context of the service delivery solution,
second operations configured to provide the service of the container by invoking second workflows that operate on each resource upon which that container depends to provide that service; and
the computer program product further comprises computer-readable program code that, when executed by the processor, is configured to execute the first operations and the second operations.

12. The computer program product of claim 11, further comprising computer-readable program code that, when executed by the processor, is configured to connect the container to one or more of the resources upon which a process on that container depends via an application programming interface utilizing standard internet protocols.

13. The computer program product of claim 11, wherein:
the container specification further comprises:
resource connectors configured to translate a logical implementation of each resource to its corresponding physical implementation, and
third operations configured to be invoked on the resource connectors by the second workflows so that the second workflows may operate on each resource upon which the container depends to provide a service; and
the computer program product further comprises computer-readable program code that, when executed by the processor, is configured to execute the third operations.

14. The computer program product of claim 13, wherein:
each of the resource connectors resides either on the computer program code or on the container; and
the computer program code further comprises computer-readable program code that, when executed by the processor, is configured to connect each of the resource connectors to its corresponding resource via an integration bus.

15. The computer program product of claim 11, wherein:
the container specification further comprises:
one or more service offerings for the service provided by that container,
one or more standardized service type templates for each of the one or more service offerings that are configured to generate a standardized user interface for providing the service of the container, and
fourth operations configured to at least one of initiate, configure, test, and activate the service provided by that container; and
the computer program code further comprises computer-readable program code that, when executed by the processor, is configured to:
publishing each different service offering for each different service to a service request catalog,
receiving input to select a service offering that is published to the service request catalog, and
invoking the process of the service that corresponds to the service offering selected from the service request catalog.

16. The computer program product of claim 15, wherein:
the container specification further comprises fifth operations configured to at least one of reserve, provision, and monitor each resource upon which the corresponding container depends to provide a service; and
the computer program product further comprises computer-readable program code that, when executed by the processor, is configured to execute the fifth operations.

17. The computer program product of claim 15, wherein:
the computer program code further comprises computer-readable program code that, when executed by the processor, is configured to invoke operations in the container specification of each of the one or more of the plurality of different containers as required to manage that container; and
managing a container comprises at least one of:
registering the container;
unregistering the container;
activating the container in the service delivery solution;
deactivating the container in service delivery solution;
configuring the container to operate as part of the service delivery solution;
patching that container with additional content;

updating that container to a newer version;
adding at least one of a second, third, fourth, fifth, and a sixth operation to the container specification of that container, the sixth operation being different than the first, second, third, fourth, and fifth operations; and
modifying at least one of a second, third, fourth, fifth, and the sixth operation to the container specification of that container.

18. The computer program product of claim 11, wherein the computer program code is configured to invoke the plurality of common capabilities with two or more processes on two or more of the plurality of different containers to provide two or more different services when executed by the processor.

19. An apparatus comprising:
A computer-readable program code; and
a processor;
said processor configured to execute the computer-readable program code;
said computer-readable program code defining a plurality of common capabilities that comprise operations that, when executed by the processor, are configured to be invoked by a plurality of different processes on a plurality of different containers, the plurality of common capabilities comprising a service delivery solution when invoked by a process from among the plurality of different processes,
wherein, when executed by the processor, the computer-readable program code is configured to:
download at least one container from among the plurality of different containers, the at least one container comprising at least one process from among the plurality of different processes when downloaded; and
invoke the plurality of common capabilities with the at least one process of the at least one container,
wherein each of the plurality of different processes corresponds to a different service, and
wherein the apparatus is configured to utilize different containers interchangeably in a plurality of different service delivery solutions as downloaded, and to expand and contract each of the plurality of different service delivery solutions by invoking greater or fewer processes on greater or fewer containers.

20. The apparatus of claim 19, wherein:
as downloaded, each of the plurality of different containers comprises a container specification that specifies each resource upon which a process on that container depends to provide a service; and
each container specification comprises:
first operations configured to automatically deploy the container by invoking first workflows that install that container in the context of the service delivery solution,
second operations configured to provide the service of the container by invoking second workflows that operate on each resource upon which that container depends to provide a service; and
the processor is configured to execute the first operations and the second operations.

21. The apparatus of claim 20, wherein the container specification further comprises one or more container interface configured to connect to one or more of the resources upon which a process on the corresponding container depends via an application programming interface utilizing standard internet protocols.

22. The apparatus of claim 20, wherein:
the container specification further comprises:
a plurality of resource connectors each configured to translate a logical implementation of each resource to its corresponding physical implementation, and
a plurality of third operations configured to be invoked on the plurality of resource connectors by the second workflows so that the second workflows may operate on each resource upon which the container depends to provide a service; and
the processor is configured to execute the plurality of third operations.

23. The apparatus of claim 22, wherein:
each of the plurality of resource connectors resides either on the apparatus or on the container; and
the apparatus further comprises an integration bus configured to connect each of the plurality of resource connectors to its corresponding resource.

24. The apparatus of claim 20, wherein:
the container specification further comprises:
one or more service offerings for the service provided by that container,
one or more standardized service type templates for each of the one or more service offerings that are configured to generate a standardized user interface for providing the service of the container, and
fourth operations configured to at least one of initiate, configure, test, and activate the service provided by the container;
the processor is configured to execute the fourth operations; and
the processor is further configured to execute the computer-readable program code to:
publish each different service offering for each different service to a service request catalog,
receive input to select a service offering that is published to the service request catalog, and
invoke the process of the service that corresponds to the service offering selected from the service request catalog.

25. The apparatus of claim 24, wherein:
the container specification further comprises fifth operations configured to at least one of reserve, provision, and monitor each resource upon which the corresponding container depends to provide a service; and
the processor is configured to execute the fifth operations.

26. The apparatus of claim 24, wherein:
the processor is further configured to execute the computer-readable program code to invoke operations in the container specification of each of the plurality of different containers as required to manage that container; and
managing a container comprises at least one of:
registering the container with the apparatus;
unregistering the container with the apparatus;
activating the container in the service delivery solution;
deactivating the container in service delivery solution;
configuring the container to operate as part of the service delivery solution;
patching that container with additional content;
updating that container to a newer version;
adding at least one of a second, third, fourth, fifth, and a sixth operation to the container specification of that container, the sixth operation being different than the first, second, third, fourth, and fifth operations; and
modifying at least one of a second, third, fourth, fifth, and the sixth operation to the container specification of that container.

27. The apparatus of claim 19, wherein the apparatus comprises two or more of the plurality of different containers and invokes the plurality of common capabilities with two or more processes on the two or more of plurality of different containers to provide two or more different services.

\* \* \* \* \*